(12) United States Patent
Motomura et al.

(10) Patent No.: US 9,778,449 B2
(45) Date of Patent: Oct. 3, 2017

(54) PREPARATION ELEMENT SET, PREPARATION, MANUFACTURING METHOD OF PREPARATION, IMAGING APPARATUS, AND IMAGING METHOD

(71) Applicant: Panasonic Intellectual Property Management Co., Ltd., Osaka (JP)

(72) Inventors: Hideto Motomura, Kyoto (JP); Yoshihisa Kato, Shiga (JP); Tsuyoshi Tanaka, Osaka (JP); Tokuhiko Tamaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 201 days.

(21) Appl. No.: 14/741,708

(22) Filed: Jun. 17, 2015

(65) Prior Publication Data
US 2015/0377866 A1     Dec. 31, 2015

(30) Foreign Application Priority Data
Jun. 27, 2014  (JP) .................................. 2014-131970

(51) Int. Cl.
*G02B 21/06* (2006.01)
*G02B 21/36* (2006.01)

(52) U.S. Cl.
CPC ........... *G02B 21/06* (2013.01); *G02B 21/362* (2013.01)

(58) Field of Classification Search
None
See application file for complete search history.

(56) References Cited

U.S. PATENT DOCUMENTS

| | | | | |
|---|---|---|---|---|
| 5,307,161 | A * | 4/1994 | Miyamoto | G01N 21/17 348/79 |
| 2013/0108211 | A1* | 5/2013 | Kwok | G02B 6/12002 385/14 |
| 2013/0134553 | A1* | 5/2013 | Kuo | H01L 23/66 257/532 |
| 2014/0070353 | A1* | 3/2014 | Kim | H01L 31/18 257/459 |

(Continued)

FOREIGN PATENT DOCUMENTS

| | | |
|---|---|---|
| JP | 4-316478 | 11/1992 |
| JP | 2009-43893 | 2/2009 |

*Primary Examiner* — Reza Aghevli
(74) *Attorney, Agent, or Firm* — Wenderoth, Lind & Ponack, L.L.P.

(57) ABSTRACT

A preparation element set including an image sensor including a sensor surface, a sensor back surface, and a board; a package including a front surface, a back surface, and terminals on the back surface, the front surface touching or facing the sensor back surface; and a transparent plate facing the sensor surface with a subject placed therebetween, wherein the board includes a board surface and a board back surface, a distance between the board surface and the sensor surface is less than a distance between the board back surface and the sensor surface, a distance between the board surface and the sensor back surface is more than a distance between the board back surface and the sensor back surface, conductive holes pierce the board from the board surface to the board back surface, and conductors on the board surface are electrically connected to terminals by using the conductive holes.

18 Claims, 31 Drawing Sheets

(56) References Cited

U.S. PATENT DOCUMENTS

| | | | |
|---|---|---|---|
| 2014/0110153 A1* | 4/2014 | Kashiwagi | B22F 1/0074 174/251 |
| 2015/0034378 A1* | 2/2015 | Kajihara | H05K 3/427 174/266 |
| 2015/0243585 A1* | 8/2015 | Umemoto | H01L 23/481 257/774 |
| 2016/0360624 A1* | 12/2016 | Kuwako | H05K 3/022 |

* cited by examiner

FIG. 22A

| LIGHTING DIRECTION | S1 | S2 | S3 | S4 |
|---|---|---|---|---|
| DIRECTION 1 | 0 | 1 | 1 | 0 |
| DIRECTION 2 | 0 | 1/2 | 1 | 1/2 |
| DIRECTION 3 | 0 | 0 | 1/2 | 1 |
| DIRECTION 4 | 1/2 | 1 | 1/2 | 0 |

FIG. 22B

| LIGHTING DIRECTION | S1 | S2 | S3 | S4 | S5 | S6 | S7 | S8 |
|---|---|---|---|---|---|---|---|---|
| DIRECTION 1 | 1/2 | 1 | 1 | 1 | 1/2 | 0 | 0 | 0 |
| DIRECTION 2 | 0 | 1/2 | 1 | 1 | 1 | 1/2 | 0 | 0 |
| DIRECTION 3 | 0 | 0 | 1/2 | 1 | 1 | 1 | 1/2 | 0 |
| DIRECTION 4 | 0 | 0 | 0 | 1/2 | 1 | 1 | 1 | 1/2 |
| DIRECTION 5 | 0 | 0 | 0 | 0 | 1/2 | 1 | 1 | 1 |
| DIRECTION 6 | 1 | 1 | 1 | 1/2 | 0 | 0 | 0 | 0 |
| DIRECTION 7 | 1 | 1 | 1/2 | 0 | 0 | 0 | 0 | 0 |
| DIRECTION 8 | 1 | 1/2 | 0 | 0 | 0 | 0 | 0 | 0 |

FIG. 25

| SPECIMEN NO. | MAGNIFICATION | IMAGE FEATURE QUANTITY | | | | PATIENT INFORMATION |
|---|---|---|---|---|---|---|
| | | FEATURE 1 | FEATURE 2 | FEATURE 3 | ... | |
| 1 | 1 | 48 | 55 | 95 | ... | PATIENT NAME A, NAME OF DISEASE X, DIAGNOSIS |
| 2 | 1 | 6 | 84 | 17 | ... | PATIENT NAME B, NAME OF DISEASE Y, DIAGNOSIS |
| 3 | 1 | 19 | 27 | 79 | ... | PATIENT NAME C, NAME OF DISEASE Z, DIAGNOSIS |
| | 2 | 81 | 14 | 76 | ... | |
| 4 | 1 | 19 | 27 | 79 | ... | PATIENT NAME D, NAME OF DISEASE X, DIAGNOSIS |
| | 2 | 50 | 34 | 94 | ... | |
| ... | ... | | | | ... | ... |

FIG. 26

| SPECIMEN NO. | PATIENT ID | MAGNIFICATION | IMAGE FEATURE QUANTITY | | | | PATIENT INFORMATION |
|---|---|---|---|---|---|---|---|
| | | | FEATURE 1 | FEATURE 2 | FEATURE 3 | ... | |
| 1 | 1 | 1 | 48 | 55 | 95 | ... | PATIENT NAME A, NAME OF DISEASE X, DIAGNOSIS |
| 2 | 2 | 1 | 6 | 84 | 17 | ... | PATIENT NAME B, NAME OF DISEASE Y, DIAGNOSIS |
| 3 | 3 | 1 | 19 | 27 | 79 | ... | PATIENT NAME C, NAME OF DISEASE Z, DIAGNOSIS |
| | | 2 | 81 | 14 | 76 | ... | |
| 4 | | 1 | 19 | 27 | 79 | ... | PATIENT NAME D, NAME OF DISEASE X, DIAGNOSIS |
| | | 2 | 50 | 34 | 94 | ... | |
| ... | ... | ... | | | | ... | ... |

PREPARATION ELEMENT SET, PREPARATION, MANUFACTURING METHOD OF PREPARATION, IMAGING APPARATUS, AND IMAGING METHOD

BACKGROUND

1. Technical Field

The present disclosure relates to a preparation element set, a preparation, a manufacturing method of preparation, an imaging apparatus, and an imaging method.

2. Description of the Related Art

In pathological diagnosis, a tissue is cut out from an organ or a tumor of a body of a patient and is examined to confirm diagnosis of a disease and to determine the extent of the disease. In this process, the cut tissue is sectioned into a slice having a thickness of several microns and sandwiched between glass plates as a pathological slide (specimen) to be examined under a microscope. Since pathological diagnosis is an examination that is typically performed to determine whether a tumor is benign or malignant, several hundred specimens could be produced a day in each hospital. Unlike radiograph, pathological specimens are difficult to store in the form of data. For this reason, the produced specimens themselves are typically stored in a semi-permanent fashion for later reference.

Microscopes have been used to observe a microstructure of a living tissue. The microscope enlarges light transmitted through an observation target or light reflected from the observation target through a lens. An observer directly views an enlarged image of light. A digital microscope photographs a microscope image through a camera, and indicates the image on a display to be observed. Multiple persons are thus enabled to view the image concurrently or a from a remote place. The camera is located at an imaging plane and photographs an image that is enlarged through the lens of the microscope.

Japanese Unexamined Patent Application Publication No. 4-316478 discloses a technique that allows a user to view a microstructure of a tissue through a contact image sensing (CIS) system. In the CIS system, an observation target is directly placed on the surface of an image sensor and then photographed. The CIS system is free from using an image enlarged through the lens, and a magnification ratio is thus determined by the pixel size of the image sensor. In other words, the smaller the pixel size is, the finer microstructure is photographed.

SUMMARY

One non-limiting and exemplary embodiment provides the implementation of photographing through the CIS system.

In one general aspect, the techniques disclosed here feature a preparation element set. The preparation element set includes an image sensor including a sensor surface, a sensor back surface opposite to the sensor surface, and a board, a package including a front surface, a back surface opposite to the front surface, and a plurality of terminals on the back surface, the front surface touching or facing the sensor back surface, and a transparent plate facing the sensor surface with a subject placed therebetween. The board includes a board surface and a board back surface opposite to the board surface. A distance between the board surface and the sensor surface is less than a distance between the board back surface and the sensor surface. A distance between the board surface and the sensor back surface is more than a distance between the board back surface and the sensor back surface. A plurality of conductive holes pierces the board from the board surface to the board back surface. A plurality of conductors on the board surface is electrically connected to the plurality of terminals by using the plurality of conductive holes.

It should be noted that general or specific embodiments may be implemented as a system, a method, an integrated circuit, a computer program, a storage medium, or any selective combination thereof.

Comprehensive and exemplary embodiments may be implemented by a preparation, a manufacturing method of the preparation, an imaging apparatus, and an imaging method. The comprehensive and exemplary embodiments may be implemented using a system, an integrated circuit, a computer program, or a non-transitory recording medium such as a compact disk read-only memory (CD-ROM). The comprehensive and exemplary embodiments may also be implemented by any combination of the preparation element set, the preparation, the manufacturing method of the preparation, the imaging apparatus, and the imaging method.

In accordance with the disclosure, a microscope is constructed in a space-saving and low-cost manner without a lens, and CIS photographing is thus implemented.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 22A illustrates an example of the elements of a matrix representing a relationship between a lighting direction and an amount of light incident on the image sensor;

FIG. 22B illustrates another example of the elements of the matrix representing the relationship between the lighting direction and the amount of light incident on the image sensor;

FIG. 25 illustrates an example of contents of a database;

FIG. 26 illustrates a database that stores an example of information of different stained specimens of the same patient associated according to a patient ID;

DETAILED DESCRIPTION

Microscopes are used to observe cells of an organ of a subject in the medical field. Observing the shape of the cells helps determine whether the subject suffers from any disease. If the subject suffers from a disease, the degree of malignancy of the disease may be determined. In an examination called pathological diagnosis, a specimen taken from a patient is sectioned into a slice having a thickness of about 4 μm and thin enough to be observed. Cells are transparent. Since a microscope image features a lower contrast, the cells are stained such that the structure of the cells are easy to be observed.

An example of a manufacturing method of a preparation A01 for pathological diagnosis is described with reference to FIG. 1.

Figure 1:
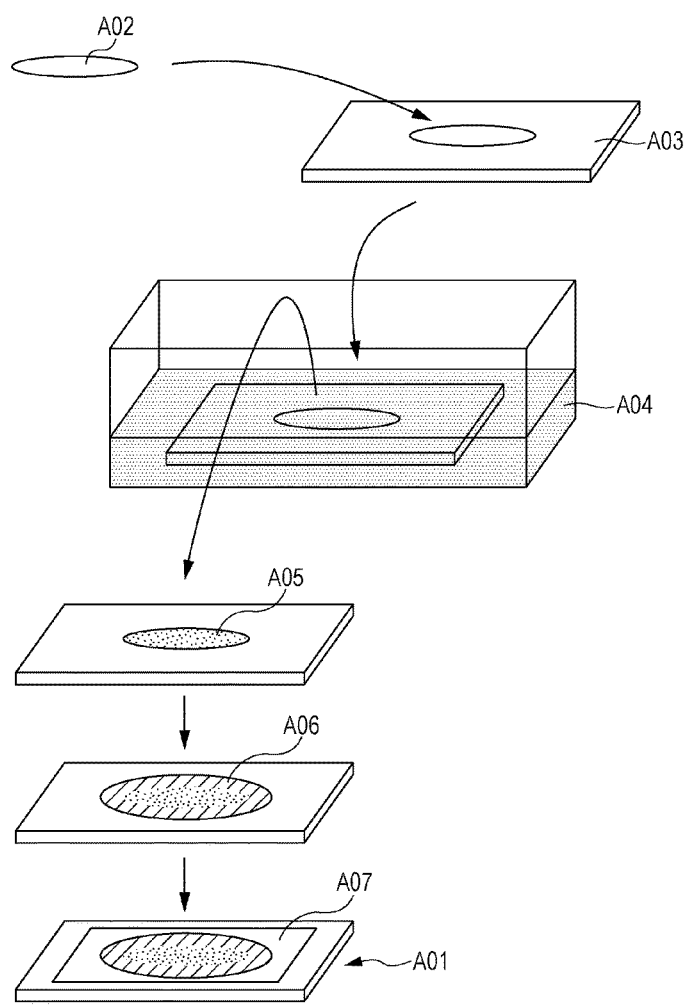
FIG. 1 illustrates a method of manufacturing a preparation for pathological diagnosis.

As illustrated in FIG. 1, a sectioned slice A02 is mounted on a slide glass plate (transparent plate) A03. The slide glass plate A03 has a size of 1 mm in thickness, 76 mm in a longer-side direction, and 26 mm in a shorter-side direction. The slice A02 is immersed together with the slide glass plate A03 into a stain fluid A04 for staining. If the slice A02 is stained with the stain fluid, the slice A02 becomes a stained slice A05. To protect and fix the stained slice A05, a sealing agent A06 is placed on the slide glass plate A03, and a cover glass plate A07 is mounted to complete a preparation A01.

Figure 2:
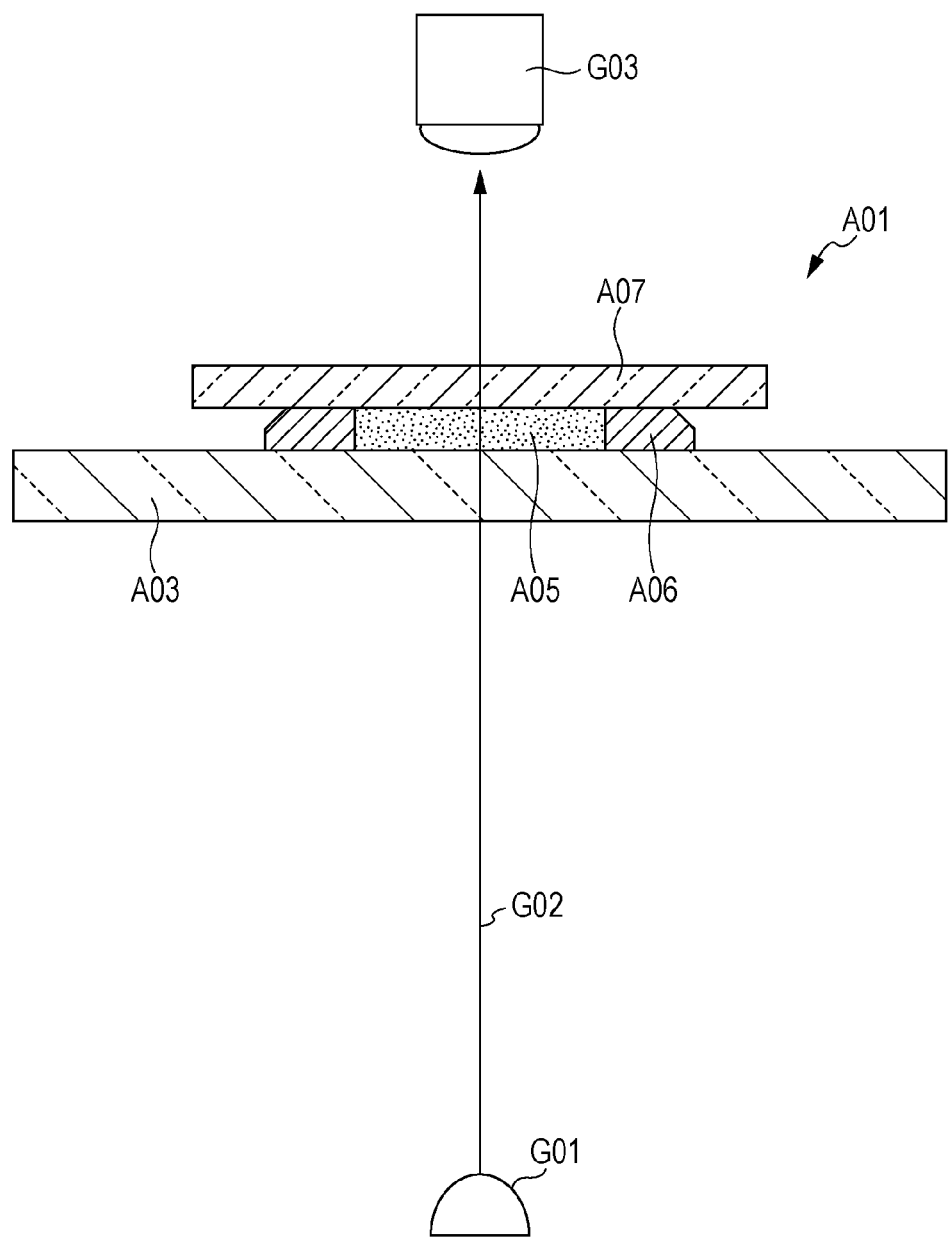
FIG. 2 is a cross-sectional view diagrammatically illustrating the preparation in an observable state under a microscope.

FIG. 2 is a cross-sectional view diagrammatically illustrating the preparation A01 in an observable state under a microscope.

As illustrated in FIG. 2, the stained slice A05 is mounted of the slide glass plate A03. The cover glass plate A07 is fixed on the slide glass plate A03 with the sealing agent A06 inserted therebetween. The stained slice A05 is enclosed by the sealing agent A06 and inserted between the cover glass plate A07 and the slide glass plate A03.

When the preparation A01 is set up and observed under an optical microscope, a light source G01 emits light from below the preparation A01. Illumination light G02 is transmitted through the slide glass plate A03, the stained slice A05, the sealing agent A06, and the cover glass plate A07 and is then incident on an objective lens G03 of the microscope.

When the preparation A01 is observed under the optical microscope, it takes time to set a magnification and an observation area.

The principle of the CIS system observation method is described with reference to FIG. 3.

Figure 3:
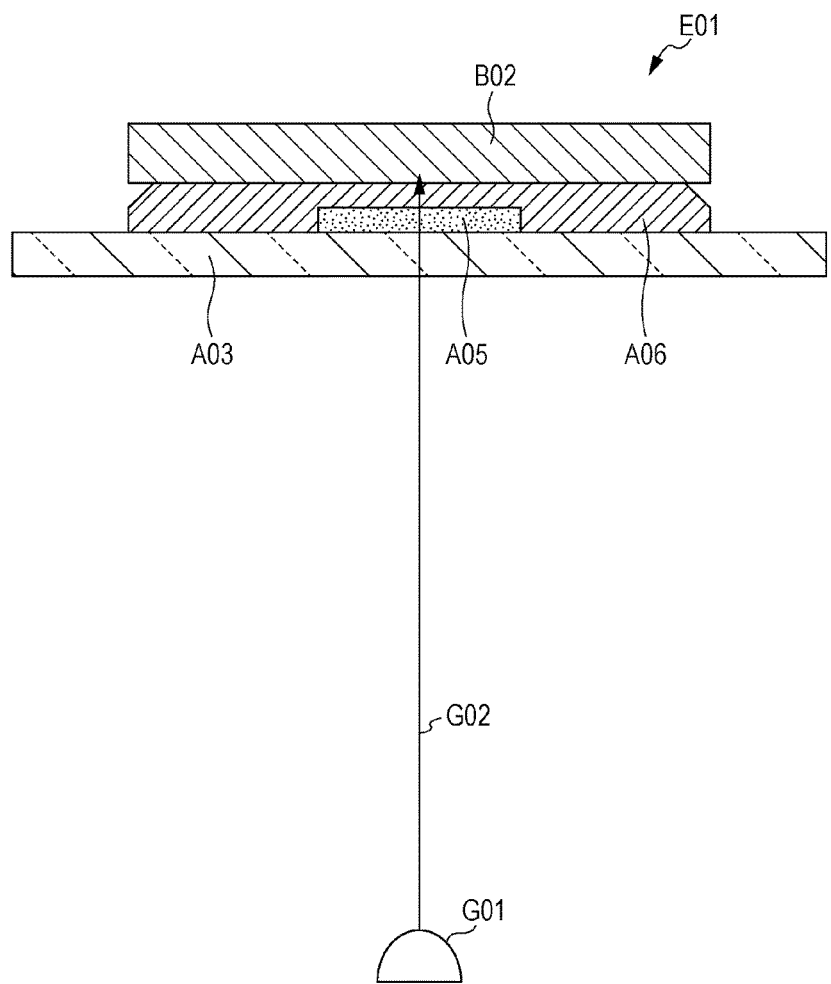
FIG. 3 illustrates the principle of the observation method using a CIS system.

Referring to FIG. 3, a preparation E01 includes an image sensor B02 in place of the cover glass plate A07. More specifically, the preparation E01 includes an ordinary slide glass plate A03, the image sensor B02 fixed on the slide glass plate A03 with the sealing agent A06 inserted therebetween, and the stained slice A05 (an object) enclosed in the sealing agent A06. The image sensor B02 may be a solid-state imaging device including a large number of photoelectric converters arranged in a matrix of rows and columns in an imaging plane. The photoelectric converter is typically a photodiode formed on a semiconductor layer or a semiconductor board, and generates charge in response to incident light. The resolution of a two-dimensional image sensor depends on a layout pitch or a layout density of the photoelectric converters on an imaging plane. The layout pitch of the photoelectric converters is approximately as short as the wavelength of visible light. The image sensor B02 is typically a charge-coupled device (CCD) image sensor or a metal-oxide semiconductor (MOS) image sensor.

During a photographing operation, illumination light G02 passes through the slide glass plate A03, the stained slice A05, and the sealing agent A06 and is incident on the image sensor B02. The image sensor B02 is electrically connected to a circuit (not illustrated), and performs the photographing operation. The image sensor B02 outputs an image signal in accordance with a light transmittance distribution (also referred to as optical density distribution), and acquires an image of the stained slice A05.

Through the CIS observation method, no optical system, such as a lens, is present between an element that performs the photographing operation and the stained slice A05. However, since fine optical detector elements (photodiodes) are arranged at a high density on the imaging plane of the image sensor B02, a miniature structure of the stained slice A05 is acquired as an image.

Figure 4:
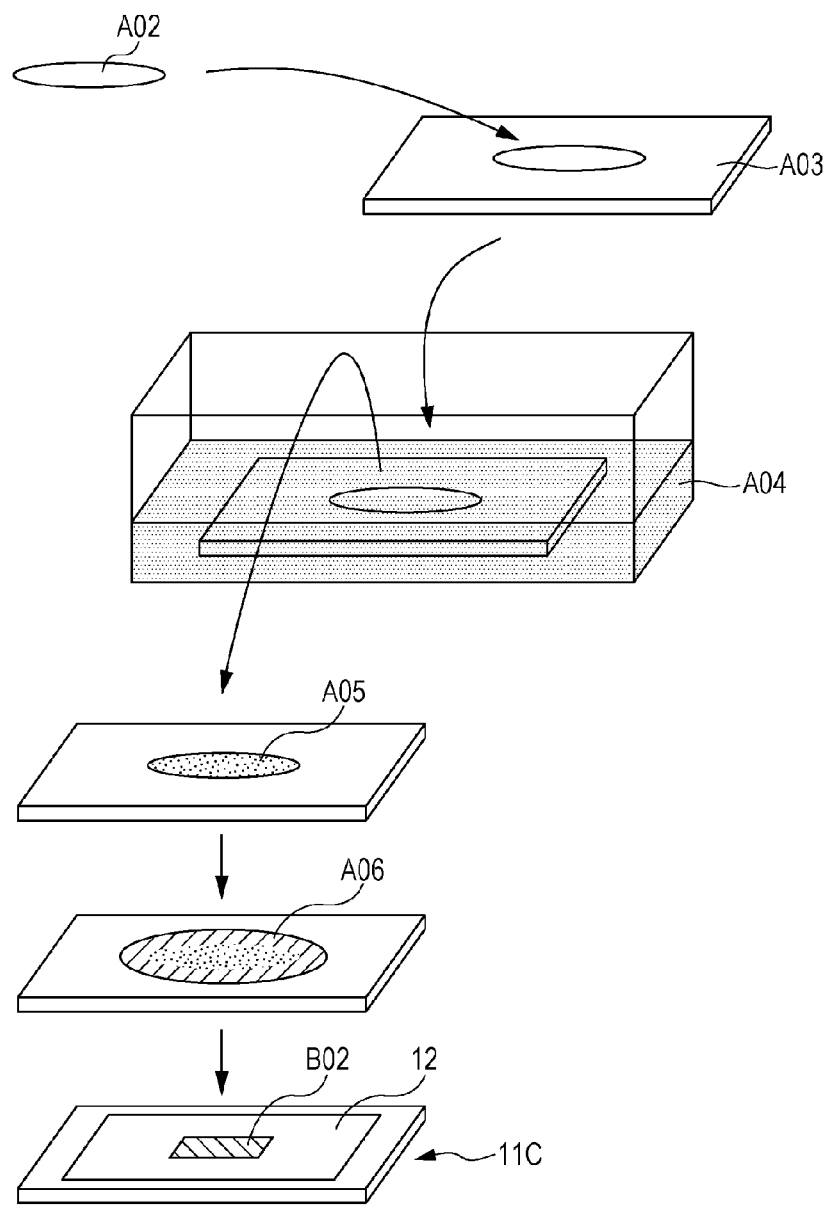
FIG. 4 illustrates a manufacturing method of a preparation as a comparative example.

Referring to FIG. 4, a manufacturing method of a preparation 11C as a comparative example is described.

As illustrated in FIG. 4, the slice A02 is mounted on the slide glass plate (transparent plate) A03. The slice A02 is immersed together with the slide glass plate A03 in the stain fluid A04 for staining. When the stain fluid A04 sticks to the slice A02, the slice A02 becomes the stained slice A05. To protect and fix the stained slice A05, the sealing agent A06 is disposed on the slide glass plate A03, and then the image sensor B02 is placed in place of the cover glass plate A07 (see FIG. 1). In the comparative example of FIG. 4, the image sensor B02 is connected to a package 12 at the back surface thereof. A preparation 11C is thus complete.

Figure 5:
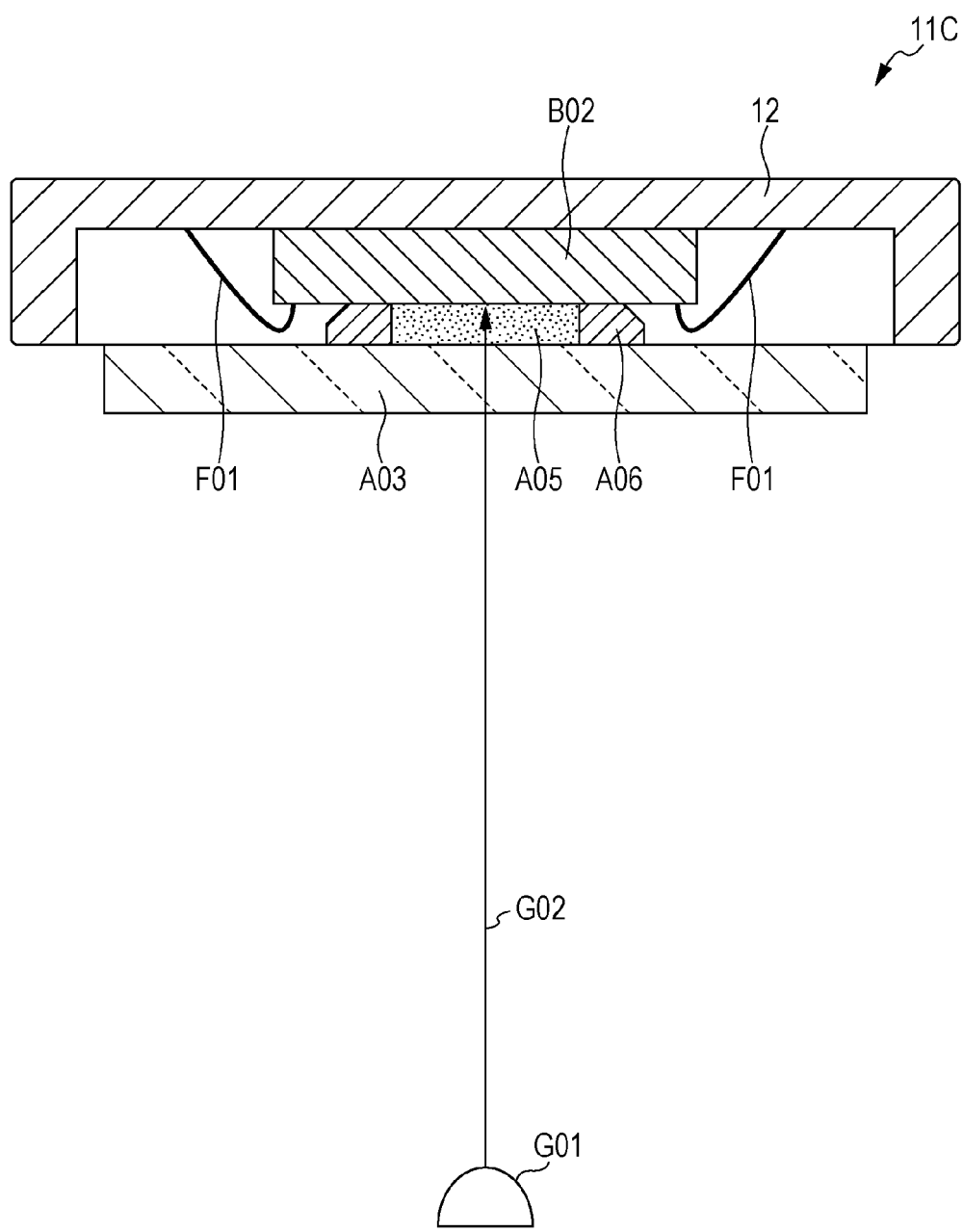
FIG. 5 diagrammatically illustrates a cross-sectional structure of a preparation as a comparative example including an image sensor and a package.

FIG. 5 diagrammatically illustrates a cross-sectional structure of the preparation 11C as a comparative example including the image sensor B02 and the package 12. In the illustrated example, the image sensor B02 is contained in the package 12, and the image sensor B02 is electrically connected to the package 12 via wire-like electrodes F01. The package 12 includes a bottom face and a wall face (side wall) forming a space that receives the image sensor B02.

Figure 6A:
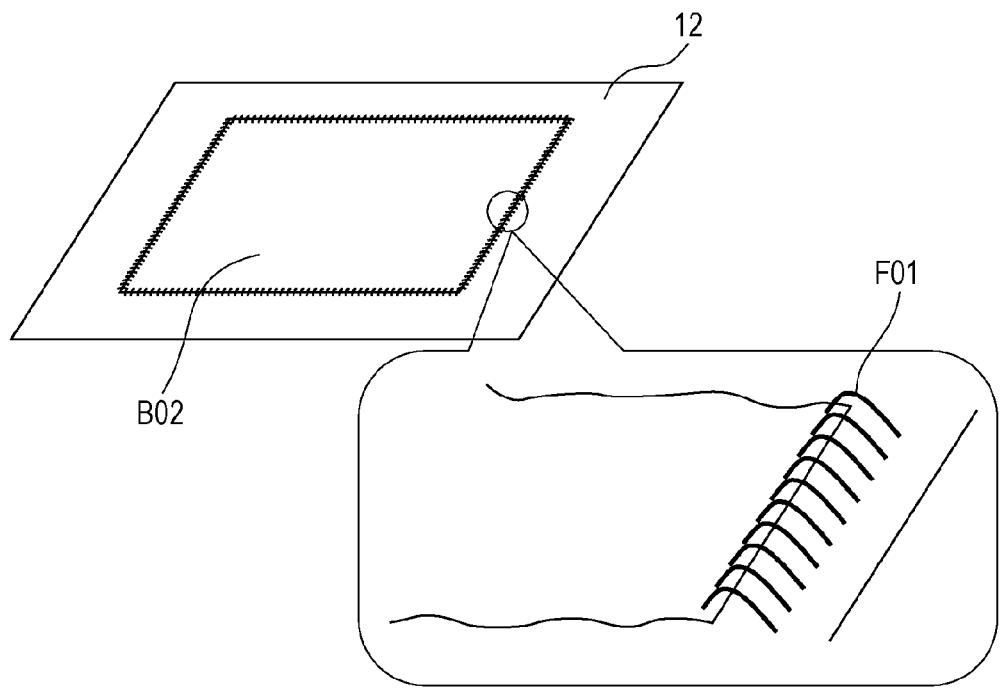
FIG. 6A is a perspective view of an arrangement example of electrodes in a preparation as a comparative example.
Figure 6B:
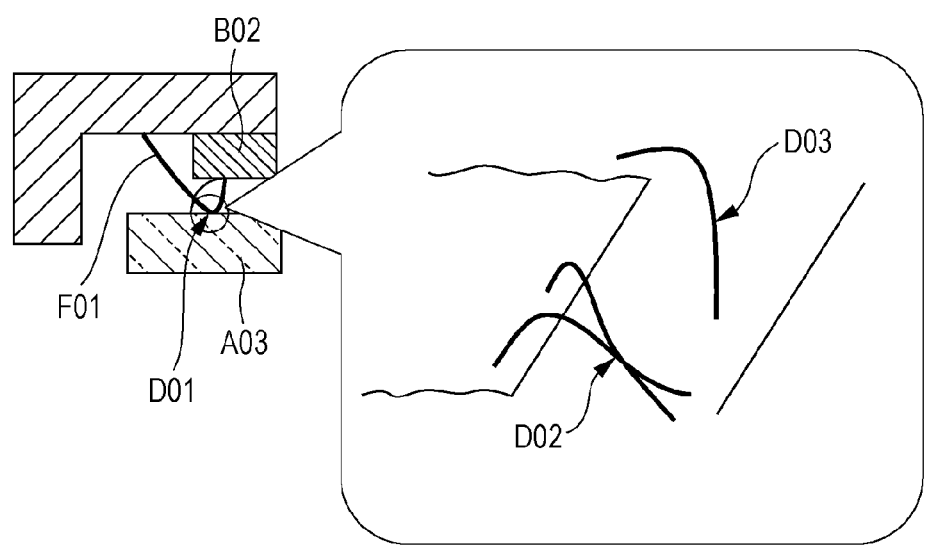
FIG. 6B illustrates a slide glass in contact with the electrodes.

The electrodes F01 electrically connecting the image sensor B02 to the package 12 as illustrated in FIG. 6A are fine metal wires in the comparative example, and are arranged densely around the image sensor B02. Since the wire electrodes F01 illustrated in FIG. 6A may be deformed, broken, or disconnected (D03) or adjacent electrodes F01 may touch and may be shorted to each other (D02) if the slide glass plate A03 touches the electrodes F01 (D01) as illustrated in FIG. 6B.

The preparation element set, the preparation, the manufacturing method of the preparation, the imaging apparatus, and the imaging method of the disclosure are directed to solving these problem.

The disclosure is described in the following aspects.

According to an aspect of the disclosure, there is provided a preparation element set. The preparation element set includes an image sensor including a sensor surface, a sensor back surface opposite to the sensor surface, and a board, a package including a front surface, a back surface opposite to the front surface, and a plurality of terminals on the back surface, the front surface touching or facing the sensor back surface, and a transparent plate facing the sensor surface with a subject placed therebetween. The board includes a board surface and a board back surface opposite to the board surface. A distance between the board surface and the sensor surface is less than a distance between the board back surface and the sensor surface. A distance between the board surface and the sensor back surface is more than a distance between the board back surface and the sensor back surface. A plurality of conductive holes pierces the board from the board surface to the board back surface. A plurality of conductors on the board surface is electrically connected to the plurality of terminals by using the plurality of conductive holes.

The board may be manufactured of a semiconductor, and include a plurality of electrodes on the board back surface connected to the plurality of conductors on the board surface. The electrodes may be electrically connected to the terminals of the package.

The image sensor may have a through silicon via (TSV) structure.

The electrodes may be covered with an insulator disposed on the front surface of the package.

The transparent plate may be a slide glass plate having a size of 76 mm in a first direction and 26 mm in a second direction perpendicular to the first direction.

According to another aspect, there is provided a preparation. The preparation includes an image sensor including a sensor surface, a sensor back surface opposite to the sensor surface, and a board, a package including a front surface, a back surface opposite to the front surface, and a plurality of terminals on the back surface, the front surface touching or facing the sensor back surface, the terminals being connected to the image sensor electrically, and a transparent plate facing the sensor surface with a subject placed therebetween. The board includes a board surface and a board back surface opposite to the board surface. A distance between the board surface and the sensor surface is less than a distance between the board back surface and the sensor surface. A distance between the board surface and the sensor back surface is more than a distance between the board back surface and the sensor back surface. A plurality of conductive holes pierces the board from the board surface to the board back surface. A plurality of conductors on the board surface is electrically connected to the plurality of terminals by using the plurality of conductive holes.

The board may be manufactured of a semiconductor, and include a plurality of electrodes on the board back surface connected to the conductors on the board surface. The electrodes may be electrically connected to the terminals of the package.

The image sensor may have a through silicon via (TSV) structure.

The electrodes may be covered with an insulator disposed on the front surface of the package.

The transparent plate may be a slide glass plate having a size of 76 mm in a first direction and 26 mm in a second direction perpendicular to the first direction.

According to another aspect of the disclosure, there is provided a manufacturing method of a preparation. The manufacturing method includes making a front surface of a package including the front surface, a back surface opposite to the front surface, and a plurality of terminals on the back surface be in touch with or face a sensor back surface of an image sensor including a sensor surface, the sensor back surface opposite to the sensor surface, and a board, placing a subject on a transparent plate or the sensor surface, and fixing the transparent plate and the image sensor in a manner such that the transparent plate faces the sensor surface with the subject placed therebetween. The board includes a board surface and a board back surface opposite to the board surface. A distance between the board surface and the sensor surface is less than a distance between the board back surface and the sensor surface. A distance between the board surface and the sensor back surface is more than a distance between the board back surface and the sensor back surface. A plurality of conductive holes pierces the board from the board surface to the board back surface. A plurality of conductors on the board surface is electrically connected to the plurality of terminals by using the plurality of conductive holes.

The fixing may include dipping the image sensor into a liquid, and placing the subject onto the sensor surface. The manufacturing method may further include pulling the image sensor with the subject placed on the sensor surface out of the liquid.

The manufacturing method may further include, subsequent to placing the subject on the transparent plate or the sensor surface, staining the subject, and drying the subject.

According to another aspect of the disclosure, there is provided an imaging apparatus. The imaging apparatus includes a socket that is loaded with the preparation, and is electrically connected to an image sensor via a plurality of terminals. The preparation includes the image sensor including a sensor surface, a sensor back surface opposite to the sensor surface, and a board, a package including a front surface, a back surface opposite to the front surface, and the plurality of terminals on the back surface, the front surface touching or facing the sensor back surface, and a transparent plate facing the sensor surface with a subject placed therebetween. The board includes a board surface and a board back surface opposite to the board surface. A distance between the board surface and the sensor surface is less than a distance between the board back surface and the sensor surface. A distance between the board surface and the sensor back surface is more than a distance between the board back surface and the sensor back surface. A plurality of conductive holes pierces the board from the board surface to the board back surface. A plurality of conductors on the board surface is electrically connected to the plurality of terminals by using the plurality of conductive holes. The imaging apparatus further includes a light source unit that emits light on the image sensor via the transparent plate, and a control device that causes the image sensor to photograph the subject by controlling the light source unit and the image sensor on the preparation loaded into the socket.

The light source unit may include a plurality of light sources or a moving light source. The control device may emit the light onto the subject with an angle of the light changed by plural times to photograph the subject at different angles.

According to another aspect of the disclosure, there is provided an imaging method. The imaging method includes loading a preparation into a socket of an imaging apparatus and electrically connecting the socket to an image sensor through a plurality of terminals. The preparation includes the image sensor including a sensor surface, a sensor back surface opposite to the sensor surface, and a board, a package including a front surface, a back surface opposite to the front surface, and the plurality of terminals on the back surface, the front surface touching or facing the sensor back surface, and a transparent plate facing the sensor surface with a subject placed therebetween. The board includes a board surface and a board back surface opposite to the board surface. A distance between the board surface and the sensor surface is less than a distance between the board back surface and the sensor surface. A distance between the board surface and the sensor back surface is more than a distance between the board back surface and the sensor back surface. A plurality of conductive holes pierces the board from the board surface to the board back surface. A plurality of conductors on the board surface is electrically connected to the plurality of terminals by using the plurality of conductive holes. The imaging method further includes emitting light from a light source unit to the image sensor via the transparent plate, and causing the image sensor to photograph the subject by controlling the light source unit and the mage sensor on the preparation loaded into the socket.

The light source unit may include a plurality of light sources or a moving light source. The causing may include emitting the light onto the subject with an angle of the light changed by plural times to photograph the subject at different angles.

According to another aspect of the disclosure, there is provided a preparation element set including an image sensor chip including a semiconductor board having a plurality of through-holes, a plurality of photoelectric converters disposed on a front side of the semiconductor board, and a signal pickup unit disposed on a back surface opposite to the front side and electrically connected to a circuit disposed on the front side via the through-holes, and a transparent preparation, the image sensor chip being glued to the transparent preparation with a subject placed therebetween.

Embodiments of the disclosure are described in detail with reference to the drawings.

The embodiments described below are comprehensive and specific examples of the disclosure. Values, shapes, materials, elements, mounting locations, connection form, steps, and order of steps in the embodiments are described for exemplary purposes only, and are not intended to limit the disclosure. Among the elements in the embodiment, elements not described in the independent claims indicative of higher concepts may be any arbitrary element. The embodiments may also be combined.

First Embodiment

Figure 7A:
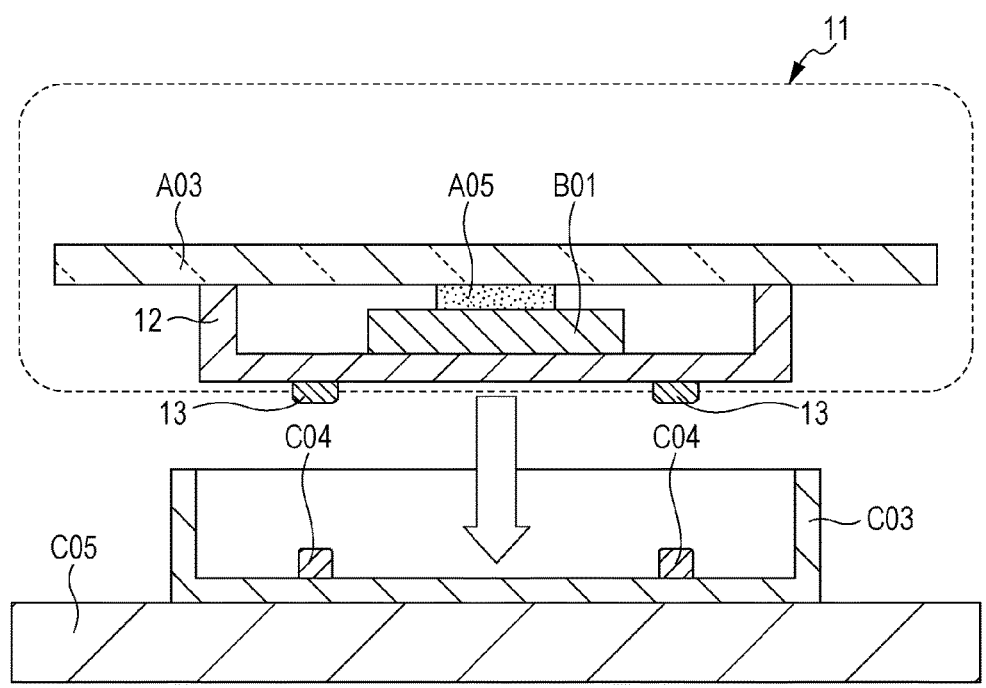
FIG. 7A is a cross-sectional view diagrammatically illustrating a preparation and a socket in an embodiment of the disclosure.

FIG. 7A diagrammatically illustrates a cross-sectional structure of a preparation 11 used in a first embodiment of the disclosure and part of an imaging unit that detachably supports the preparation 11. The entire structure of the imaging unit is described below. The imaging unit includes the socket C03 configured to receive the preparation 11. The socket C03 is electrically connected to a circuit board C05. The socket C03 is electrically connected to the circuit board C05 by setting multiple terminals disposed on the back surface of the socket C03 to be in touch with wirings or electrodes pads disposed on the circuit board C05. The circuit board C05 may have a structure available in the related art, and may be a multi-layered printed circuit board. The socket C03 may be mounted on the circuit board C05 in one of related art mounting methods to mount electronic components onto a circuit board. The package 12 includes on the back surface thereof terminals 13 to electrically connect an image sensor B01 to an external circuit. The socket C03 includes multiple terminals C04 disposed to electrically connect to the terminals 13 of the package 12.

Figure 7B:
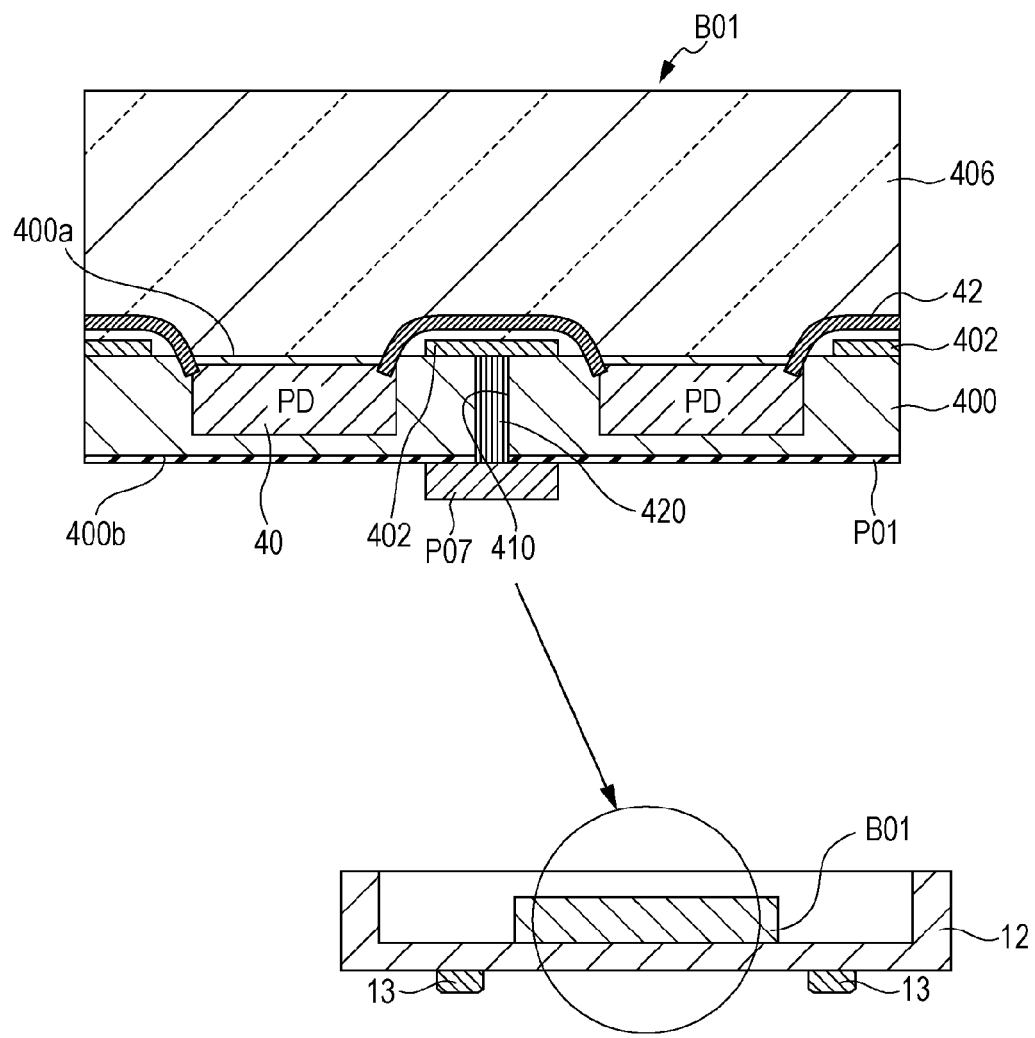
FIG. 7B is a cross-sectional view illustrating part of an image sensor in the embodiment of the disclosure.

FIG. 7B is a cross-sectional view partially illustrating the image sensor B01 in the embodiment of the disclosure. The image sensor B01 includes a semiconductor board 400 and a wiring layer 402 disposed on a surface 400a of the semiconductor board 400. The semiconductor board 400 includes a via 410 that pierces therethrough from the surface 400a to a back surface 400b. FIG. 7B illustrates the single via 410, but the actual semiconductor board 400 has a large number of vias 410. Each of the multiple vias 410 includes a conductor 420. The conductors 420 electrically connect the wiring layer 402 to the multiple terminals 13 on the package 12. The conductors 420 is electrically insulated from the semiconductor board 400 by an insulation layer (not illustrated). The conductors 420 is manufactured of a metal having a sufficiently low electrical resistance. A structure in which a conductor in a via piercing through a semiconductor board leads to the back surface of the semiconductor board is typically applied to a silicon board, and is thus called through silicon via (TSV) structure. The semiconductor board 400 is typically manufactured of single crystal silicon, but may be manufactured of another semiconductor.

In the TSV structure, a signal pickup unit may be disposed on the back surface of the semiconductor board (the surface opposite to the front surface having photoelectric converters), and a circuit (a power supply, a driver circuit, and/or a signal processor circuit) disposed on the front surface of an image sensor chip is connected to the signal pickup unit through through-vias. The image sensor chip having the TSV structure may be referred to "backside illumination type".

Referring to FIG. 7B, the conductors 420 filling the via 410 is connected to one of the multiple electrodes P07 disposed on the back surface 400b of the semiconductor board 400. The image sensor B01 is electrically connected to the package 12 via the electrodes P07 in place of the wire-like electrodes F01 described with reference to the comparative case.

As illustrated in FIG. 7B, the image sensor B01 includes the semiconductor board 400, photodiodes (PDs) 40 disposed in the front surface of the semiconductor board 400, wiring layer 402 supported by the semiconductor board 400, light shielding layer 42 covering the wiring layer 402, transparent layer 406 covering a light incident surface of the semiconductor board 400, and insulation layer P01 covering the back surface of the semiconductor board 400.

If the image sensor B01 is a CCD image sensor, the semiconductor board 400 includes beneath the wiring layer 402 an impurity diffusion layer (not illustrated) that functions as a vertical or horizontal charge transfer path. The wiring layer 402 is connected to an electrode (not illustrated) disposed on the charge transfer path. If the image sensor B01 is a MOS image sensor, a MOS transistor (not illustrated) is formed on a per pixel basis on the semiconductor board 400. The MOS transistor functions as a switching element that reads a charge on the photodiode 40. An organic semiconductor film or inorganic semiconductor film formed in the upper portion of the semiconductor board 400 may be used as a photoelectric conversion film that converts light into charge in place of the photodiode 40 formed in the semiconductor board 400.

Figure 7C:
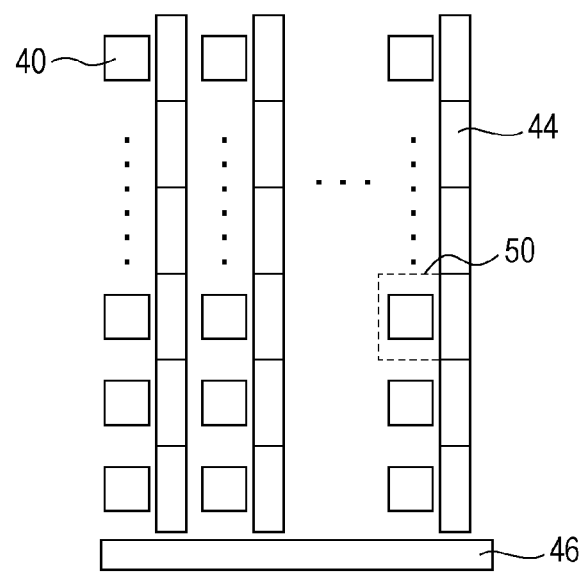
FIG. 7C is a plan view diagrammatically illustrating part of an imaging plane of a charge-coupled device (CCD) image sensor as an example of the image sensor.

FIG. 7C is a plan view diagrammatically illustrating part of an imaging plane of a charge-coupled device (CCD) image sensor as an example of the image sensor B01. As illustrated in FIG. 7C, multiple photodiodes (photoelectric converters) 40 are arranged in a matrix of rows and columns on the imaging plane. As illustrated in FIG. 7C, a single pixel 50 is represented a broken-lined rectangle in FIG. 7C. A large number of pixels 50 is densely arranged in a matrix of rows and columns in the imaging plane.

Light incident on the photodiode 40 generates charge in the photodiode 40. An amount of charge generated varies depending an amount of light incident on the photodiode 40. Charges generated in each photodiode 40 move along a vertical charge transfer path 44 extending vertically. The generated charges thus move along the vertical charge transfer paths 44 and then reach a horizontal transfer path 46. The charges are transferred along the horizontal charge transfer path 46 and then are output from one end of the horizontal charge transfer path 46 to the outside of the image sensor B01 as a pixel signal. Transfer electrodes (not illustrated) are disposed on the vertical charge transfer paths 44 and the horizontal charge transfer path 46. The image sensor B01 used in the imaging apparatus of the disclosure is not limited to the structure described above. The MOS image sensor may be used in place of the CCD image sensor.

Figure 7D:
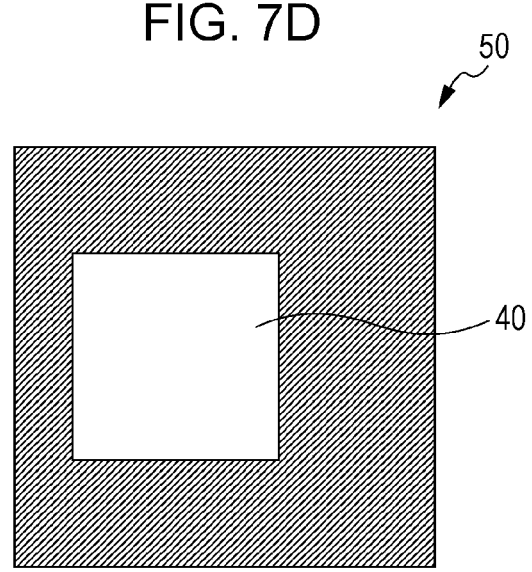
FIG. 7D is a plan view diagrammatically illustrating a single pixel.

FIG. 7D is a plan view diagrammatically illustrating a single pixel 50. A region covered with the light shielding layer 42 is hatched. Elements other than the photodiode 40 in the image sensor B01 are covered with the light shielding layer 42. In the embodiment of the disclosure, a micro lens that increases the aperture ratio of each photodiode 40 is not arranged in the image sensor B01. Parallel light rays are incident on the photodiode 40. In accordance with the embodiment of the disclosure, the size of the photodiode 40 determines the resolution. The larger in size the photodiode 40 is, the lower the resolution becomes.

Figure 7E:
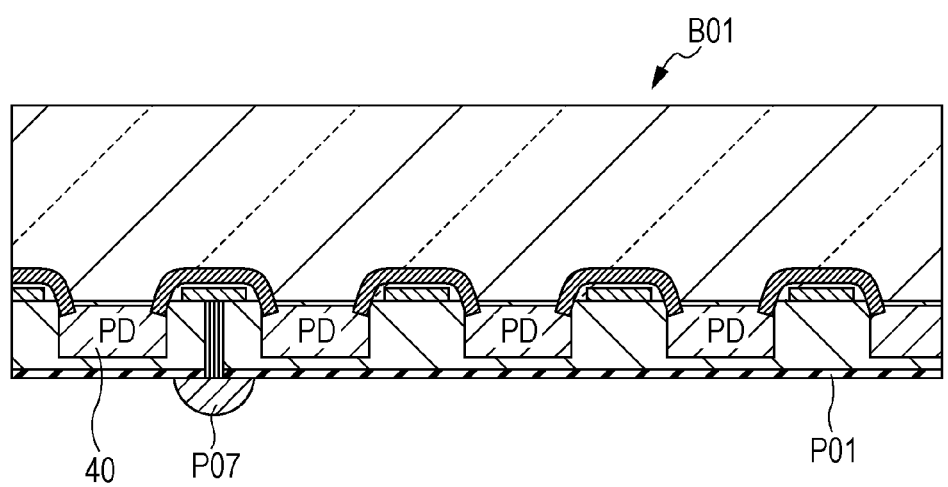
FIG. 7E is a cross-sectional view illustrating a wider portion of the image sensor.
Figure 7F:
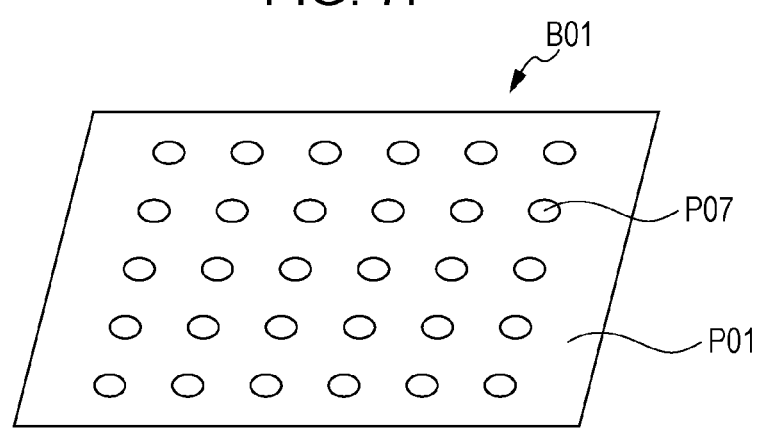
FIG. 7F is a perspective view illustrating a large number of electrodes (bumps) disposed on the sensor back surface of the image sensor.

FIG. 7E is a cross-sectional view illustrating a wider portion of the image sensor B01. In this example, an electrode is hemispherical. Referring to FIG. 7F, a large number of electrodes (bumps) P07 are disposed on the back surface of the image sensor B01. The electrodes P07 are isolated from each other by the insulation layer P01.

Figure 7G:
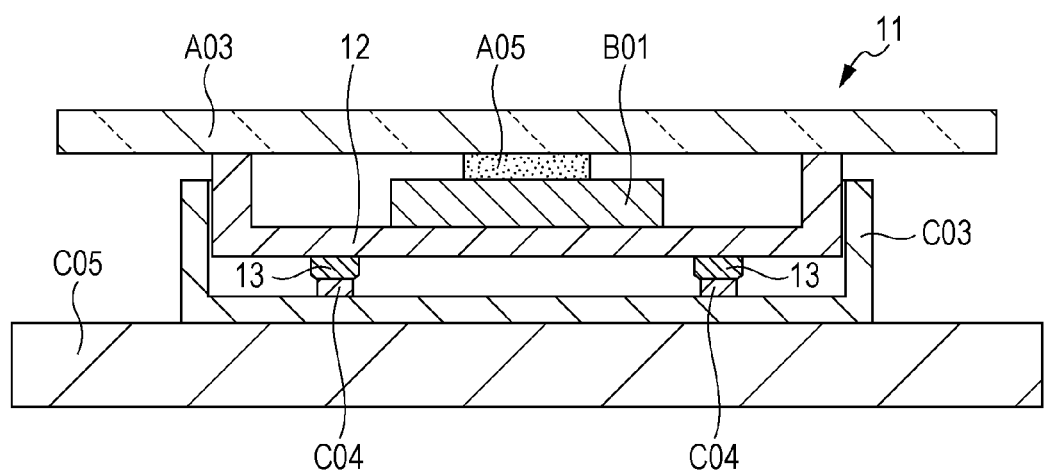
FIG. 7G diagrammatically illustrates a cross-sectional structure of the preparation and the socket.

FIG. 7G diagrammatically illustrates the preparation 11 loaded in the socket C03. The preparation 11 is temporarily fixed to the socket C03 by means of the structure of the socket C03 and other mechanism. The terminal C04 of the socket C03 is electrically connected to the image sensor B01 via the terminal 13 of the package 12 by loading. The structure of the socket C03 is not limited to the structure described herein. The electrical connection between the socket C03 and the image sensor B01 is not limited to the connection described herein.

Illumination light is directed to the preparation 11 from above in the state illustrated in FIG. 7G, and transmitted through the stained slice A05, and then incident on the image sensor B01. A photographing operation is then performed by multiple times. After the preparation 11 as a photographing target is photographed, the preparation 11 is removed from the socket C03, and another preparation 11 is then loaded in the socket C03 as a next photographing target.

Figure 8:
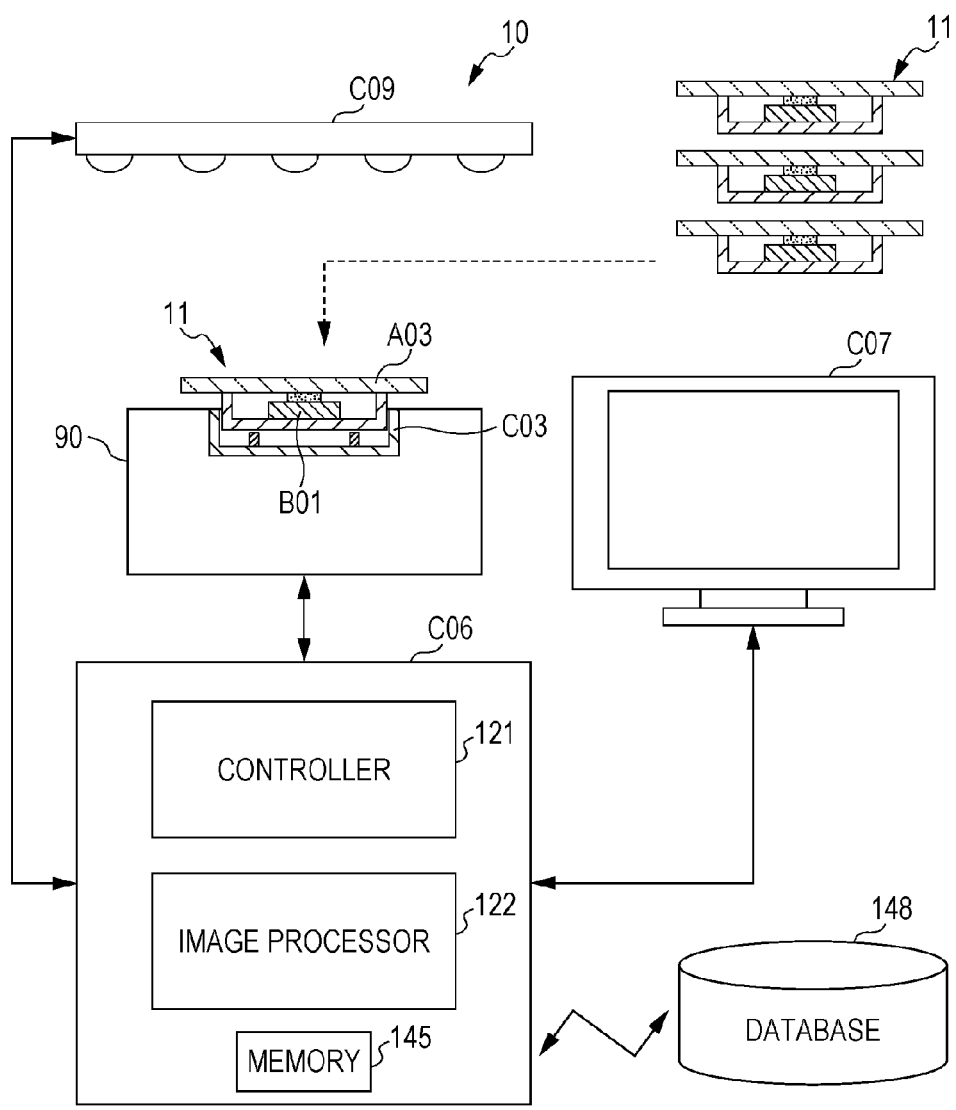
FIG. 8 illustrates an imaging apparatus of a first embodiment.

FIG. 8 generally illustrates an imaging apparatus 10 of the embodiment.

The imaging apparatus 10 includes a lighting system C09 that emits light to the image sensor B01 via a slide glass plate A03 in the preparation 11 loaded in the socket C03. The structure and operation of the lighting system C09 are described below. In the example illustrated in FIG. 8, the lighting system C09 is located above the preparation 11 supported by an imaging unit 90. The embodiment of the disclosure is not limited to this arrangement. Alternatively, the preparation 11 is located above the lighting system C09, or a line connecting the lighting system C09 and the preparation 11 may be tilted from a vertical alignment in FIG. 8.

The imaging apparatus 10 includes a control device (computer) C06, and the control device C06 includes a controller 121, an image processor 122, and a memory 145. The controller 121 controls the lighting system C09 and the image sensor B01 of the preparation 11 loaded in the socket C03. The controller 121 thus causes the image sensor B01 to photograph the stained slice in the preparation 11.

As described with reference to FIG. 7G, the package 12, if loaded in the socket C03, is electrically connected to the socket C03. The socket C03 is connected to the control device C06 of FIG. 8 via the circuit board C05 of FIG. 7G.

The image data obtained as a result of photographing is combined and pixel-interpolated through the image processor 122. These processes result in a photographed image of the stained slice at a higher resolution. The photographed image is displayed on a display C07, for example, and stored on the memory 145 or the database 148.

Figure 9:
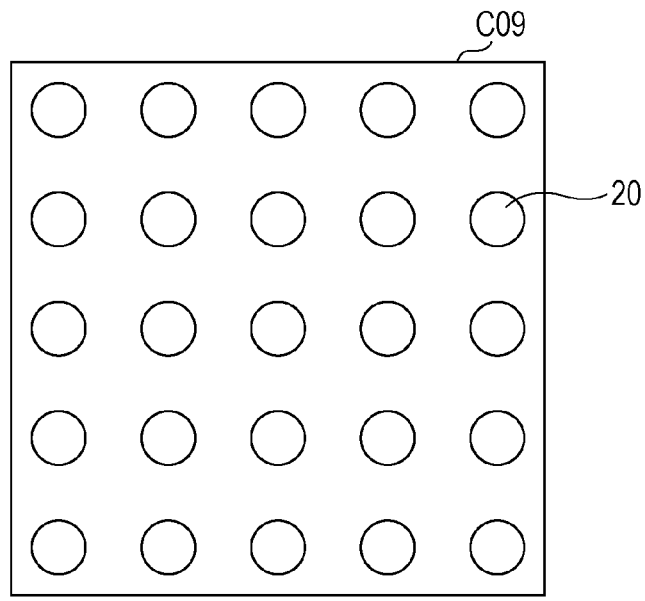
FIG. 9 is a plan view illustrating an example of a lighting system included in the imaging apparatus of the first embodiment.

FIG. 9 is a plan view diagrammatically illustrating a layout of light source elements in the lighting system C09 used in the first embodiment of the disclosure. As illustrated in FIG. 9, 25 light source elements 20 are arranged in a matrix of rows and columns. More specifically, the light source elements 20 are arranged in a matrix of five rows and five columns on the light output side of the lighting system C09.

Figure 10:
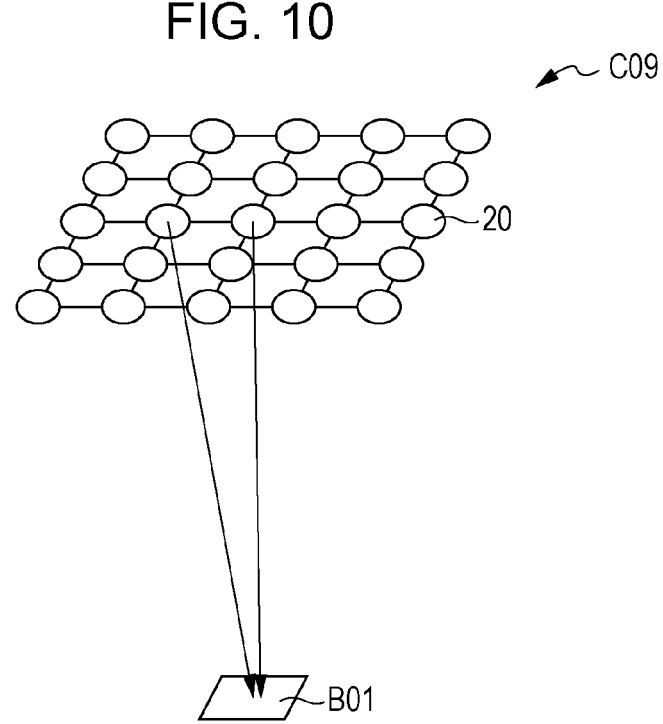
FIG. 10 is a perspective view illustrating the relationship between the lighting system of FIG. 9 and the image sensor.

As illustrated in FIG. 10, the lighting system C09 including the light source elements 20 arranged in a matrix causes illumination light rays to be incident on the image sensor B01 in the preparation at a different angle. The illumination light rays emitted from the light source elements 20 are substantially parallel and incident on the image sensor B01. If the lighting system C09 includes at least four light source elements 20, the illumination light rays are caused to be incident on the image sensor B01 in the preparation with the lighting direction successively changed one by one, from at least four different directions. The light source elements 20 in the lighting system C09 may include a combination of light emitting elements, such as LEDs, and a color filter. Each light source element 20 may also include an optical element to adjust the divergence of a light beam and a reflecting mirror.

The manufacturing method of the preparation 11 of the first embodiment is described with reference to FIG. 11.

The sectioned slice A02 is mounted on the slide glass plate A03. The location of the slice A02 on the slide glass plate A03 is not necessarily in the center of the slide glass plate A03. In the example of FIG. 11, the slice A02 is closer to one end of the slide glass plate A03. The slice A02 together with the slide glass plate A03 is immersed in the stain fluid A04 for staining. The slice A02 thus stained with the stain fluid A04 becomes the stained slice A05. To protect and fix the stained slice A05, a sealing agent is applied on the slide glass plate A03. The package 12 having the image sensor thereon is mounted on the slide glass plate A03. In this operation, the package 12 is adjusted in location to be in alignment with the stained slice A05. FIG. 12 illustrates the stained slice A05 at a different location on the slide glass plate A03. In this example, as well, the package 12 is adjusted in location to be in alignment with the stained slice A05.

Figure 11:
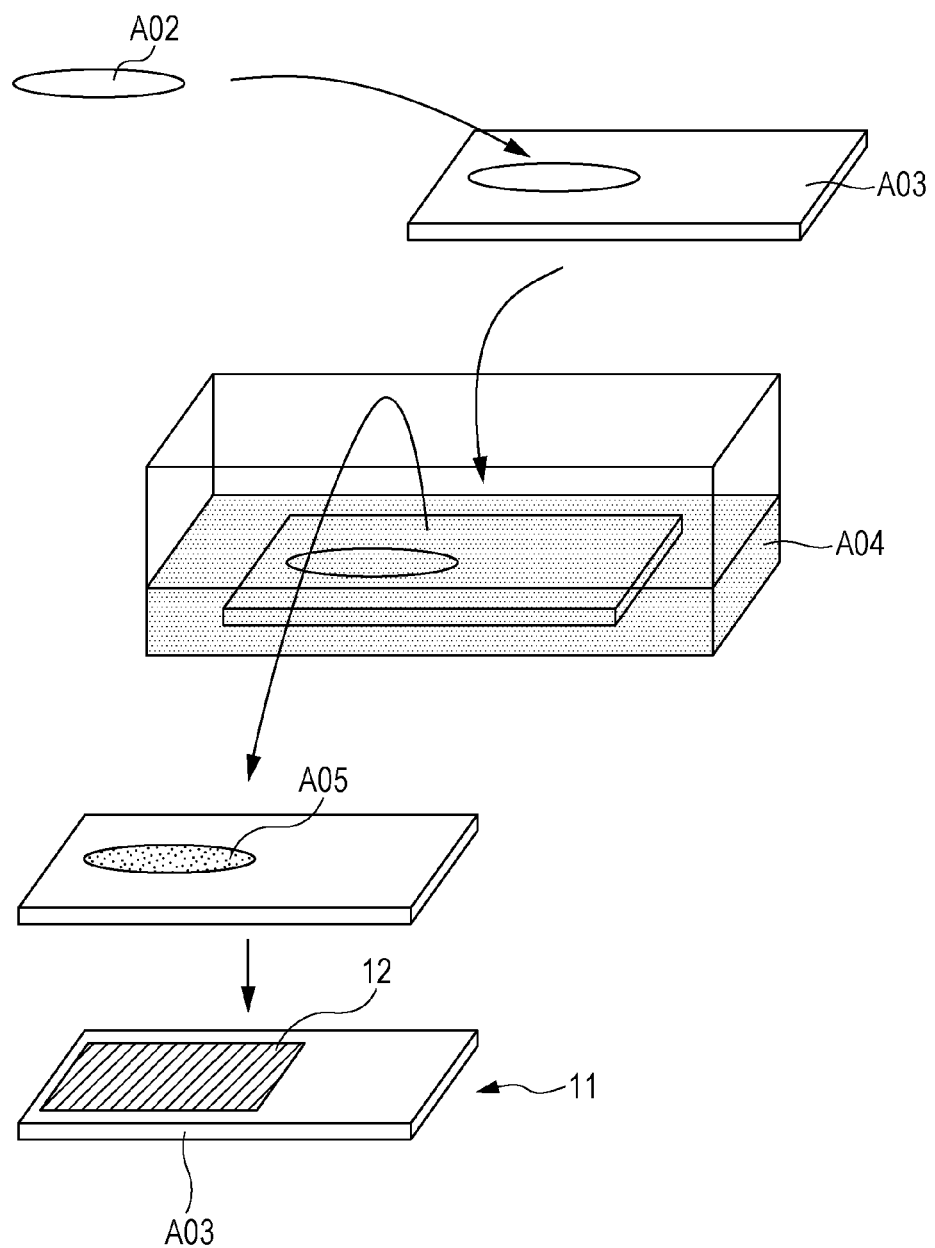
FIG. 11 illustrates a manufacturing method of the preparation of the embodiment.
Figure 12:
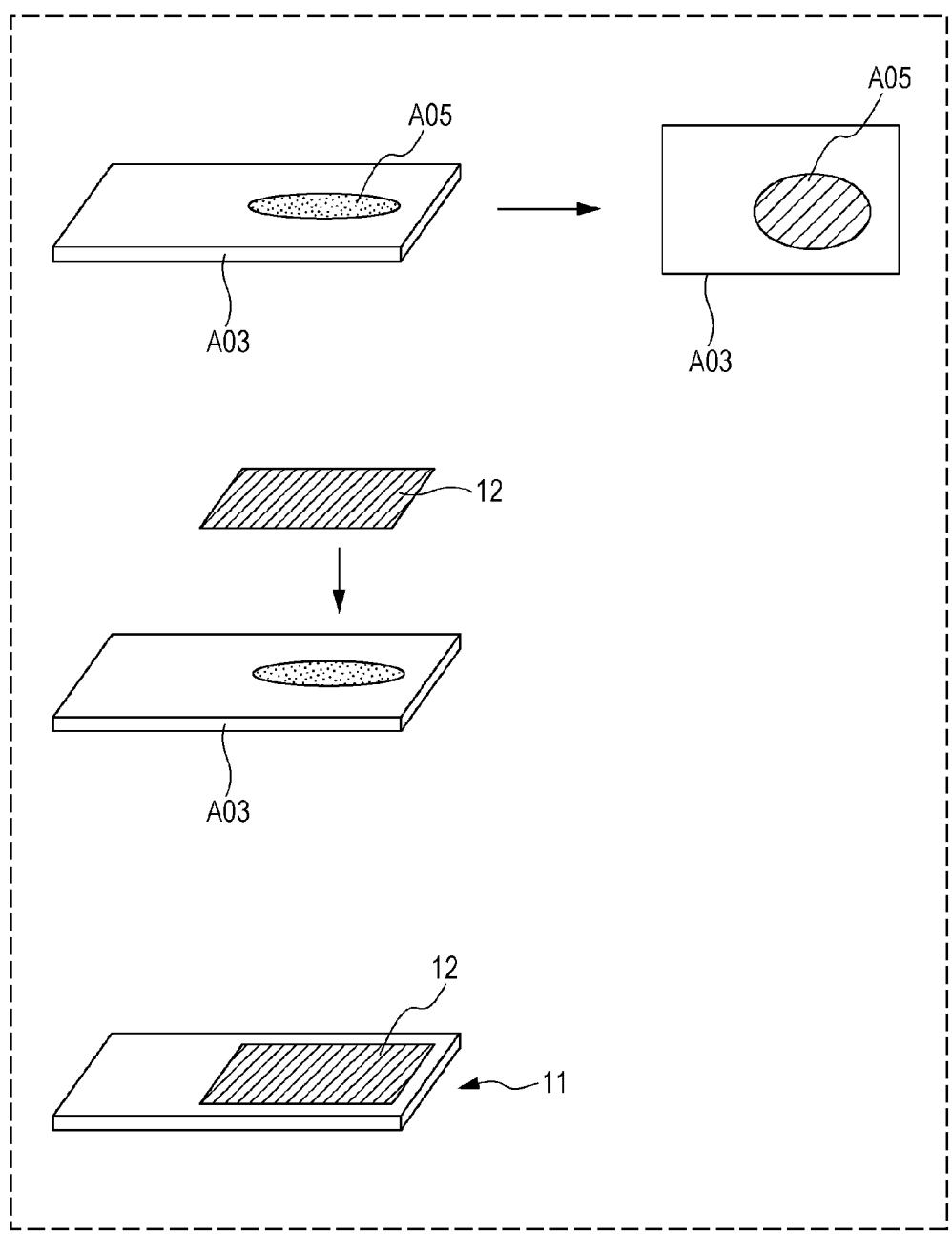
FIG. 12 illustrates stained sections present at different locations on a slide glass plate.

Referring to FIG. 11 and FIG. 12, the back surface of the package 12 is seen. Although the package 12 has a thickness in practice, the package 12 is illustrated as a thin film in FIG. 11 and FIG. 12.

When the package 12 with the image sensor B01 fixed thereto is mounted on the slide glass plate A03, the package 12 may be electrically connected to the imaging unit to perform the photographing operation. In this photographing operation, the positional relationship between the image sensor B01 and the stained slice A05 may be detected. Sine no optical system is present between the image sensor B01 and the stained slice A05, the image of the stained slice A05 acquired by the image sensor B01 is blurred, but the location of the stained slice A05 is detectable.

Figure 13:
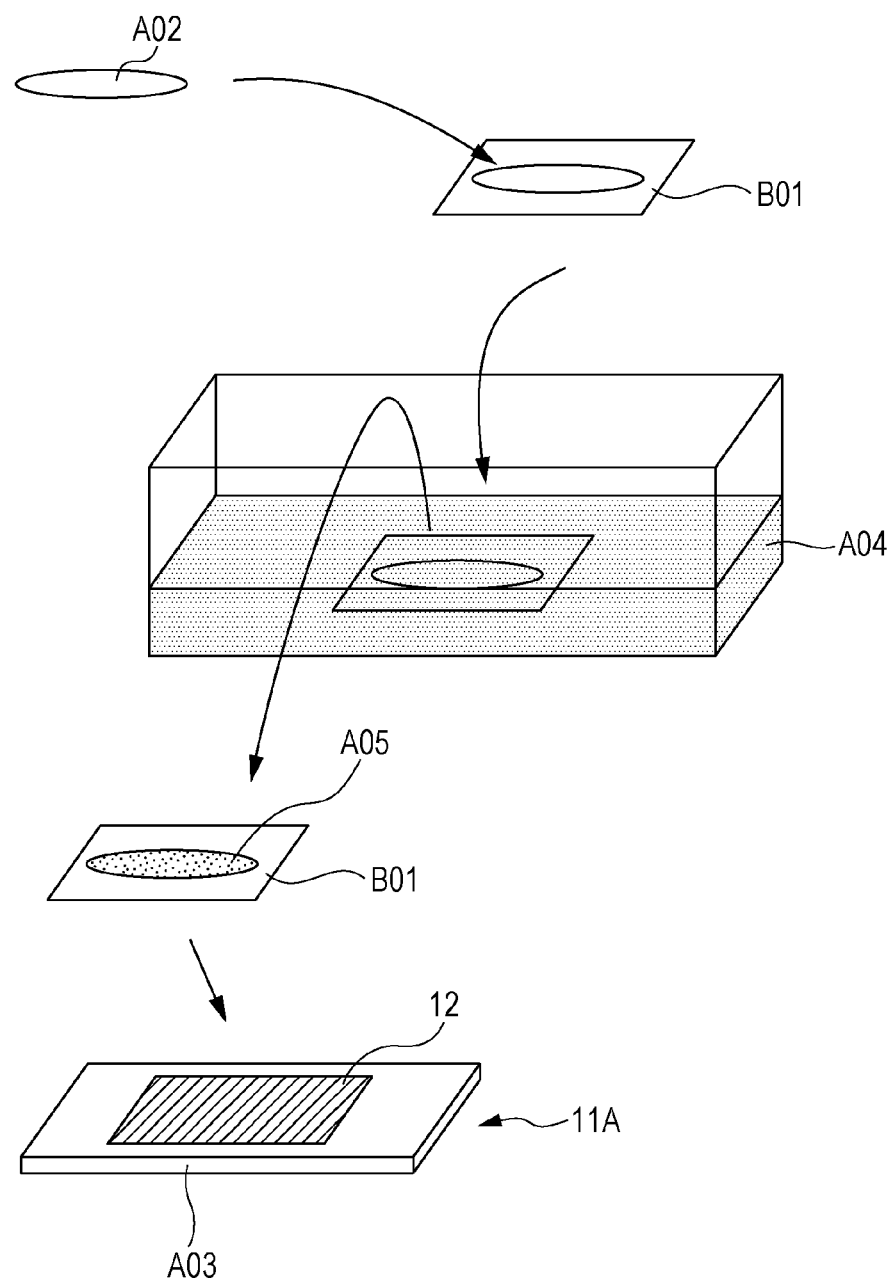
FIG. 13 illustrates a manufacturing method of a preparation of another embodiment of the disclosure.

Referring to FIG. 13, the manufacturing method of a preparation 11A of another embodiment is described below.

The sectioned slice A02 is mounted on the imaging plane of the image sensor B01. The image sensor B01 may be in a state mounted on a package (not illustrated) or in a state prior to being mounted on the package. The electrodes of the image sensor B01 are waterproofed. The waterproofing operation may be performed by covering the electrodes on the front surface of the package. The slice A02 is immersed together with the image sensor B01 into the stain fluid A04 for staining. The slice A02, if stained with the stain fluid A04, becomes the stained slice A05. The slice A02 in the stain fluid A04 may be lifted using a package (not illustrated), for example. To protect and fix the stained slice A05, the sealing agent is applied on the image sensor B01. The image sensor B01 is fixed onto the slide glass plate A03 with the stained slice A05 disposed on the slide glass plate A03.

In practice, the slice A02 prior to staining is covered with paraffin (not illustrated) in the stain fluid A04. When the slice A02 is lifted up with the package 12 (see FIG. 5) from the stain fluid A04, paraffin may spread out of the image sensor B01 in the package 12. In such a case, the image sensor B01 is connected with the package 12 via bonding wires, the bonding wires may be damage by paraffin. The embodiment of the disclosure controls such a problem.

In the embodiment of the disclosure, the magnification and point of view may be changed without switching lenses and moving the slide glass plate. The imaging apparatus of the embodiment may be applied to a specimen management apparatus.

An example of the specimen management apparatus that is implemented using the imaging apparatus is described below.

Figure 14:
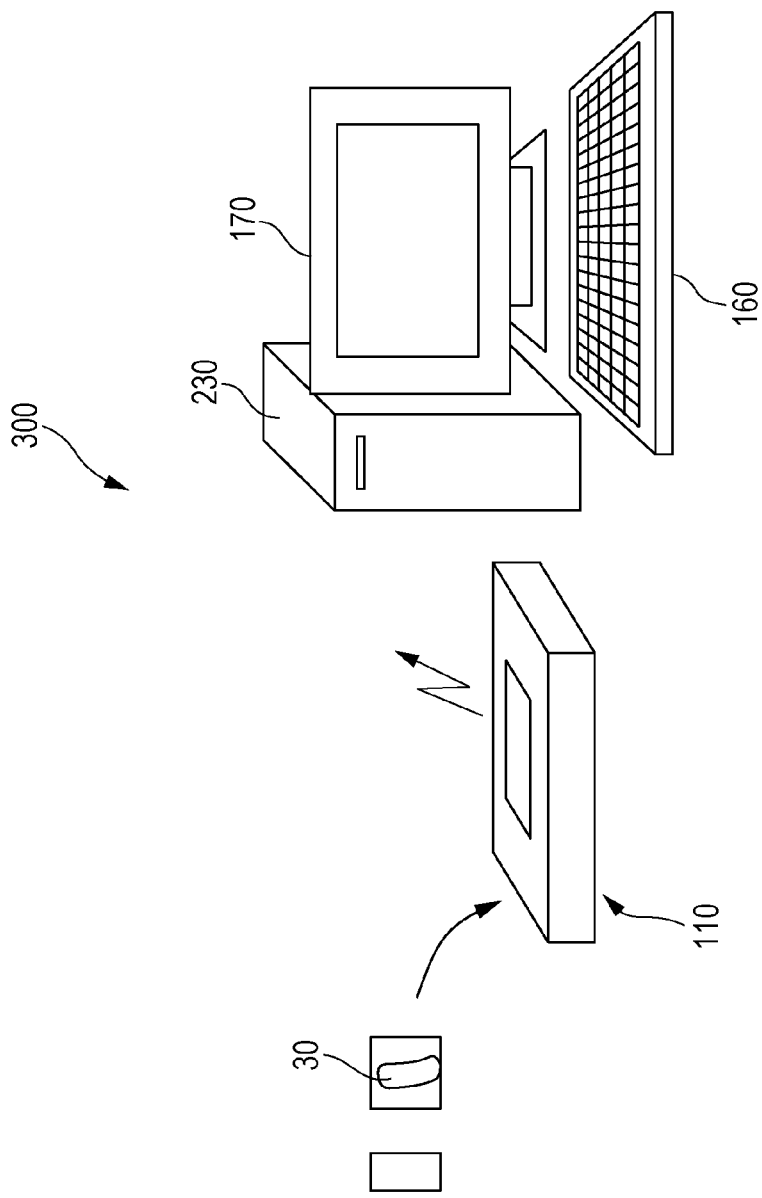
FIG. 14 illustrates an example of the entire configuration of a specimen management apparatus.

FIG. 14 illustrates an example of the entire configuration of the specimen management apparatus 300.

The specimen management apparatus 300 includes a specimen image acquisition apparatus 110 and an information processing apparatus 230. The specimen image acquisition apparatus 110 may be the imaging apparatus 10 that has been described with reference to FIG. 8. The specimen image acquisition apparatus 110 may acquire the image of the pathological specimen 30 including a preparation of the embodiment (such as the preparation 11) at one of multiple resolutions (magnifications).

The information processing apparatus 230 is connected to the specimen image acquisition apparatus 110 in a wired or wireless fashion, and receives information acquired by the specimen image acquisition apparatus 110. The information processing apparatus 230 determines a feature quantity of an image acquired by the specimen image acquisition apparatus 110, and causes the output apparatus 170 to output the patient information of the pathological specimen 30 in response to the feature quantity. More in detail, the information processing apparatus 230 references a database (not illustrated in FIG. 14) that associates the feature quantity calculated from a specimen image of the patient with patient information, and searches for the patient information matching the feature quantity of the image of the pathological specimen 30.

The information processing apparatus 230 is connected to an input apparatus 160 and an output apparatus 170. With the input apparatus 160, the user may input data and an instruction to the information processing apparatus 230. The input apparatus 160 may be a keyboard, a mouse, or a touchscreen. The output apparatus 170 may be a display that is configured to display an image and characters, a printer, or a loudspeaker. The input apparatus 160 and the output apparatus 170 may be a unitary module into which the functions thereof are integrated. If the specimen management apparatus 300 includes the input apparatus 160 and the output apparatus 170, the imaging apparatus as the specimen image acquisition apparatus 110 may not necessarily have to include the control device (computer) C06 and the display C07 (see FIG. 8).

If one piece of patient information matching the feature quantity of the image is stored on the database, the information processing apparatus 230 outputs the patient information to the output apparatus 170. If multiple pieces of patient information matching the image are stored on the database, the information processing apparatus 230 acquires a high-resolution image having a resolution higher than the resolution of the image, and searches the database for patient information matching the feature quantity of the high-resolution image. If no piece of patient information matching the feature quantity of the high-resolution image is stored on the database, the information processing apparatus 230 receives patient information from the input apparatus 160, associates the feature quantity calculated from the image with the patient information and stores the associated information onto the database. The specimen image acquisition apparatus 110 acquires a high-resolution image having a resolution higher than the resolution of the first acquired image, and the information processing apparatus 230 stores the feature quantity calculated from each image and patient information in association with each other.

Figure 15:
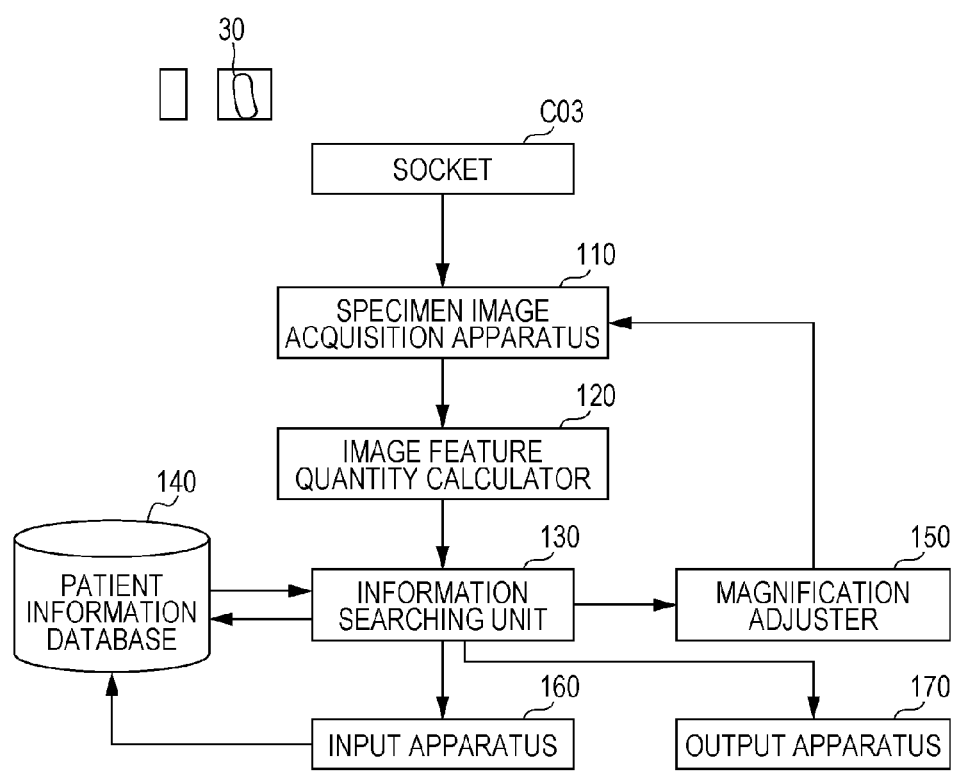
FIG. 15 is a block diagram illustrating the configuration of the specimen management apparatus.

FIG. 15 is a block diagram illustrating the configuration of the specimen management apparatus 300. As illustrated in FIG. 15, the specimen management apparatus 300 of FIG. 14 includes the socket C03, specimen image acquisition apparatus 110, image feature quantity calculator 120, information searching unit 130, patient information database (hereinafter referred to as simply referred to as a database) 140, magnification adjuster 150, input apparatus 160, and output apparatus 170.

The pathological specimen 30, the patient information of which is to be acquired or updated, is placed on the socket C03. The pathological specimen 30 may be one of the preparations described with reference to the embodiment. The pathological specimen 30 is herein the preparation 11.

The specimen image acquisition apparatus 110 captures an image of the specimen in the preparation 11 (the stained slice A05) at one of predetermined multiple different magnifications. The image feature quantity calculator 120 calculates an image feature quantity from the image acquired by the specimen image acquisition apparatus 110. The information searching unit 130 searches the database 140 that stores the patient information and the image feature quantity in association with each other for patient information matching the image feature quantity calculated by the image feature quantity calculator 120. If multiple hits acquired by the information searching unit 130 are present, the magnification adjuster 150 changes a magnification for acquisition to a higher magnification (a higher resolution), the specimen image acquisition apparatus 110 acquires an image again, and performs a search operation based on information acquired at the higher magnification (higher resolution).

If the patient information matching the image feature quantity is not hit by the information searching unit 130, the input apparatus 160 receives the patient information as a specimen as a new patient. If the patient information matching the image feature quantity is hit by the information searching unit 130, the output apparatus 170 outputs the acquired patient information.

The operation and configuration of each element of the specimen management apparatus 300 are described more in detail.

Operation of Specimen Management Apparatus

Figure 16:
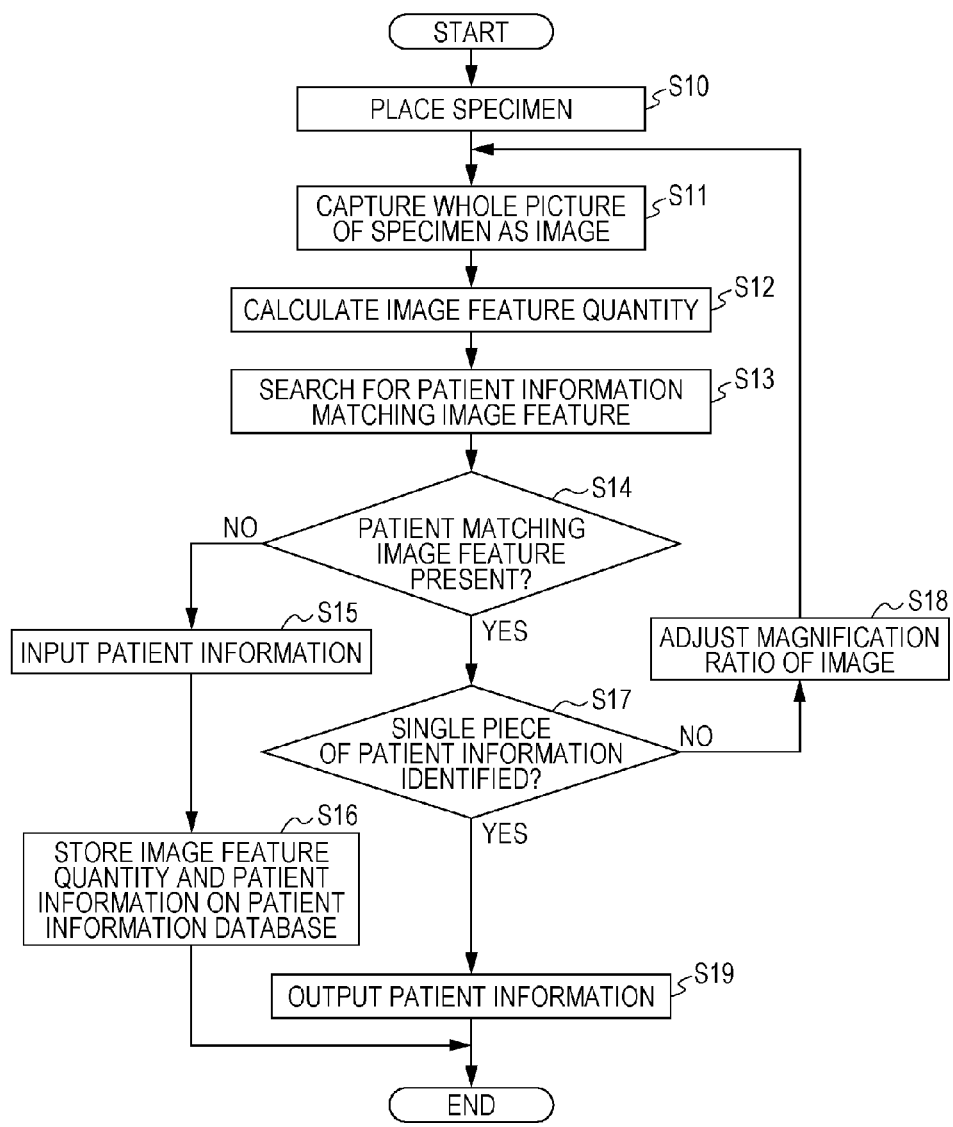
FIG. 16 is a flowchart illustrating a process example of a specimen management method.

Refer to FIG. 16. FIG. 16 is a flowchart illustrating a process of a specimen management method.

In step S10, the preparation 11, the patient information of which is to be referenced or updated, is placed on the socket C03. The socket C03 is configured to receive the preparation 11. More specifically, the socket C03 may have a recess sized to precisely receive the pathological specimen 30. Such socket C03 may control a position deviation in the pathological specimen 30 that could occur when the image is captured. Standardized pathological specimens having a size of 76 mm by 26 mm are typically used in Japan. The socket C03 is thus shaped to receive such pathological specimen 30.

Figure 17:
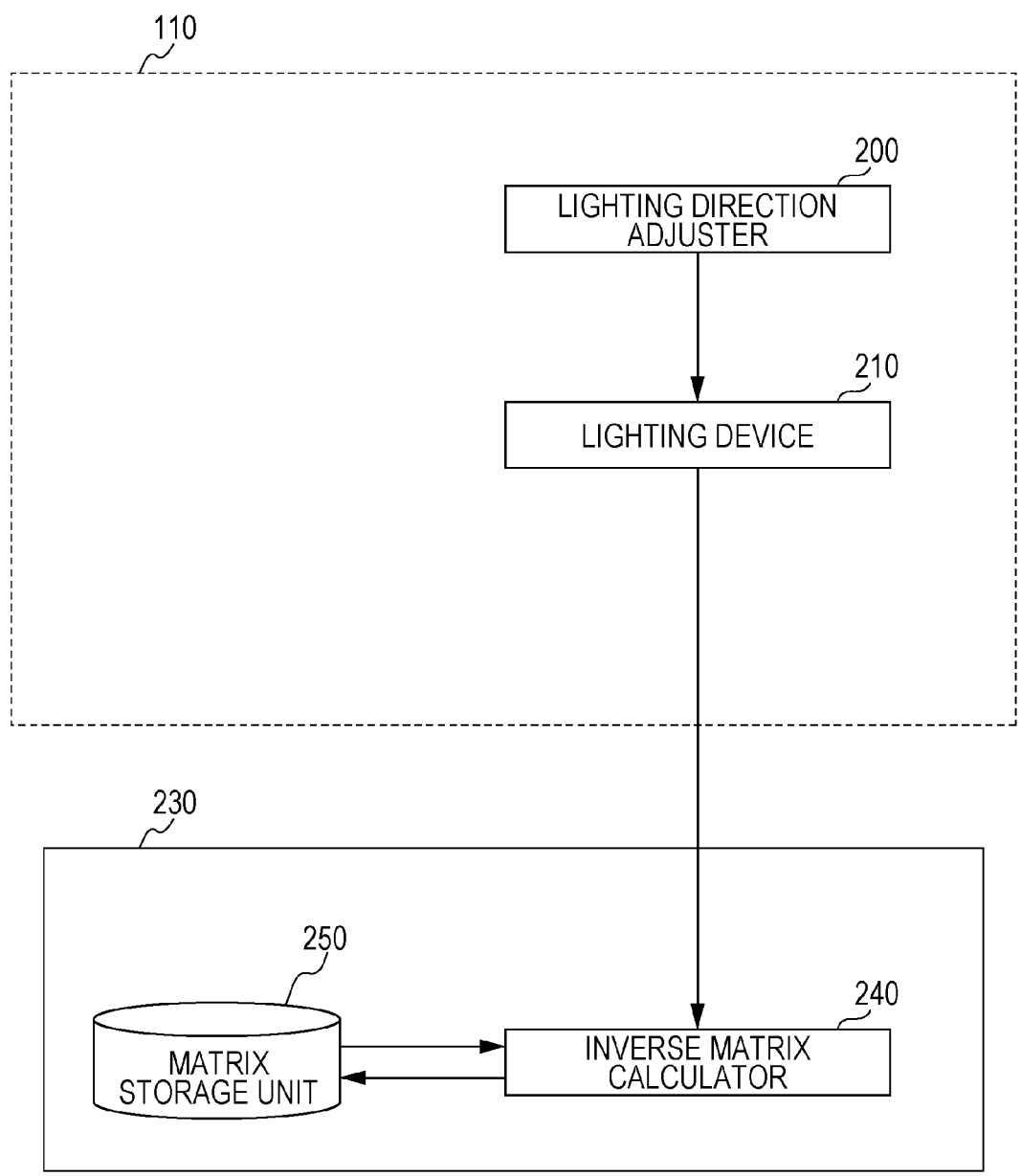
FIG. 17 is a block diagram illustrating the configuration of a specimen image acquisition apparatus.

In step S11, the specimen image acquisition apparatus 110 acquires an image of the pathological specimen 30 at one of predetermined multiple different magnifications. FIG. 17 is a block diagram illustrating the configuration of the specimen image acquisition apparatus 110. As illustrated in FIG. 17, the specimen image acquisition apparatus 110 includes a lighting direction adjuster 200, and a lighting device 210. The lighting device 210 includes the light source G01 that causes light to be incident on the image sensor B01 of the preparation 11. The specimen image acquisition apparatus 110 acquires an image (such as a whole picture) at any magnification specified by the information processing apparatus 230.

When an image is acquired at a different magnification, a high-resolution enhancement process may be performed by an inverse matrix calculator 240 and a matrix storage unit 250. As illustrated in FIG. 17, the inverse matrix calculator 240 and the matrix storage unit 250 may be included in the information processing apparatus 230. Alternatively, the inverse matrix calculator 240 and/or the matrix storage unit 250 may be included in the specimen image acquisition apparatus 110. The operation of the inverse matrix calculator 240 and the matrix storage unit 250 is described below in detail.

An image acquisition process is described with reference to FIG. 18.

Figure 19A:
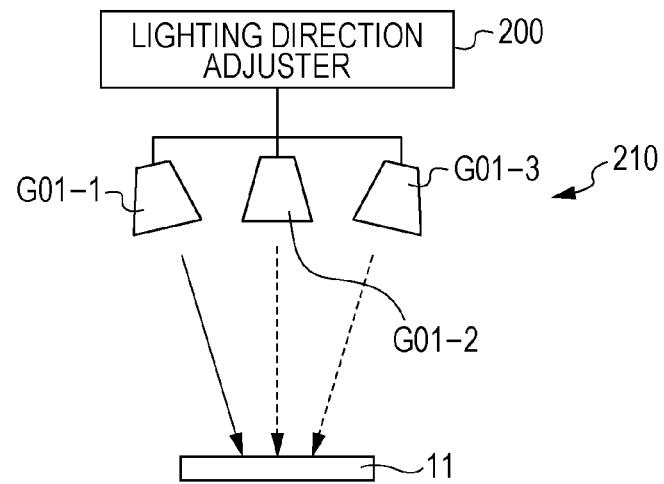
FIG. 19A illustrates a configuration of a lighting device.
Figure 19B:
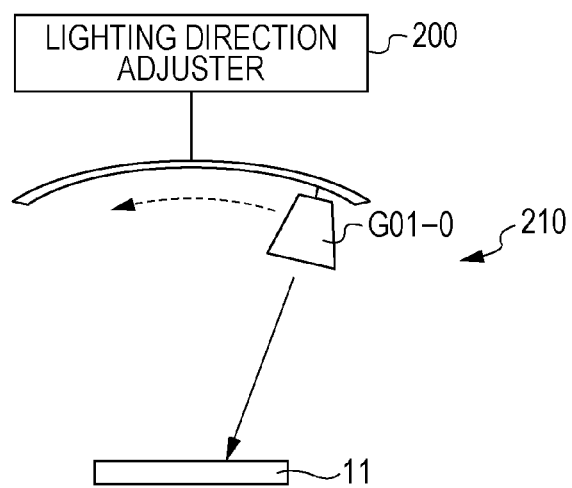
FIG. 19B illustrates another configuration of the lighting device.

In step S110, the lighting direction adjuster 200 adjusts an angle of parallel illumination light incident on the pathological specimen 30. To adjust the lighting direction, multiple light sources may be arranged to emit light at predetermined angles as illustrated in FIG. 19A (including light sources G01-1, G01-2, and G01-3), or as illustrated in FIG. 19B, a single light source G01-0 may be directed to a specified angle.

Figure 20A:
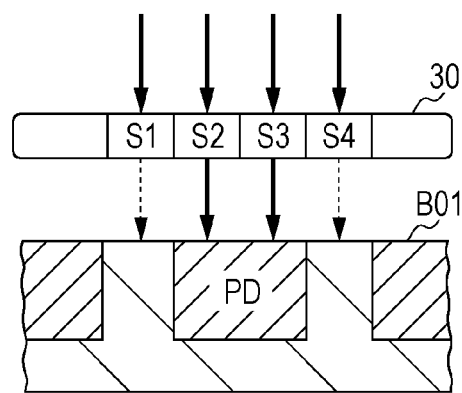
FIG. 20A illustrates a change in a lighting direction.
Figure 20B:
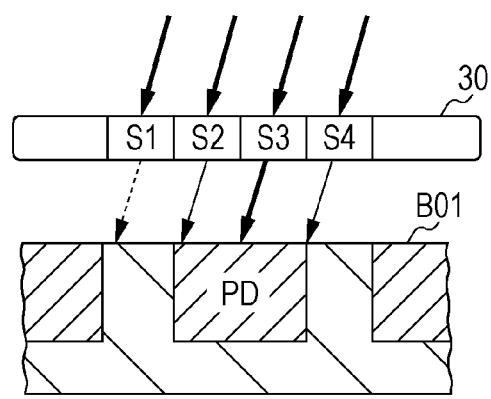
FIG. 20B illustrates a change in the lighting direction.
Figure 21:
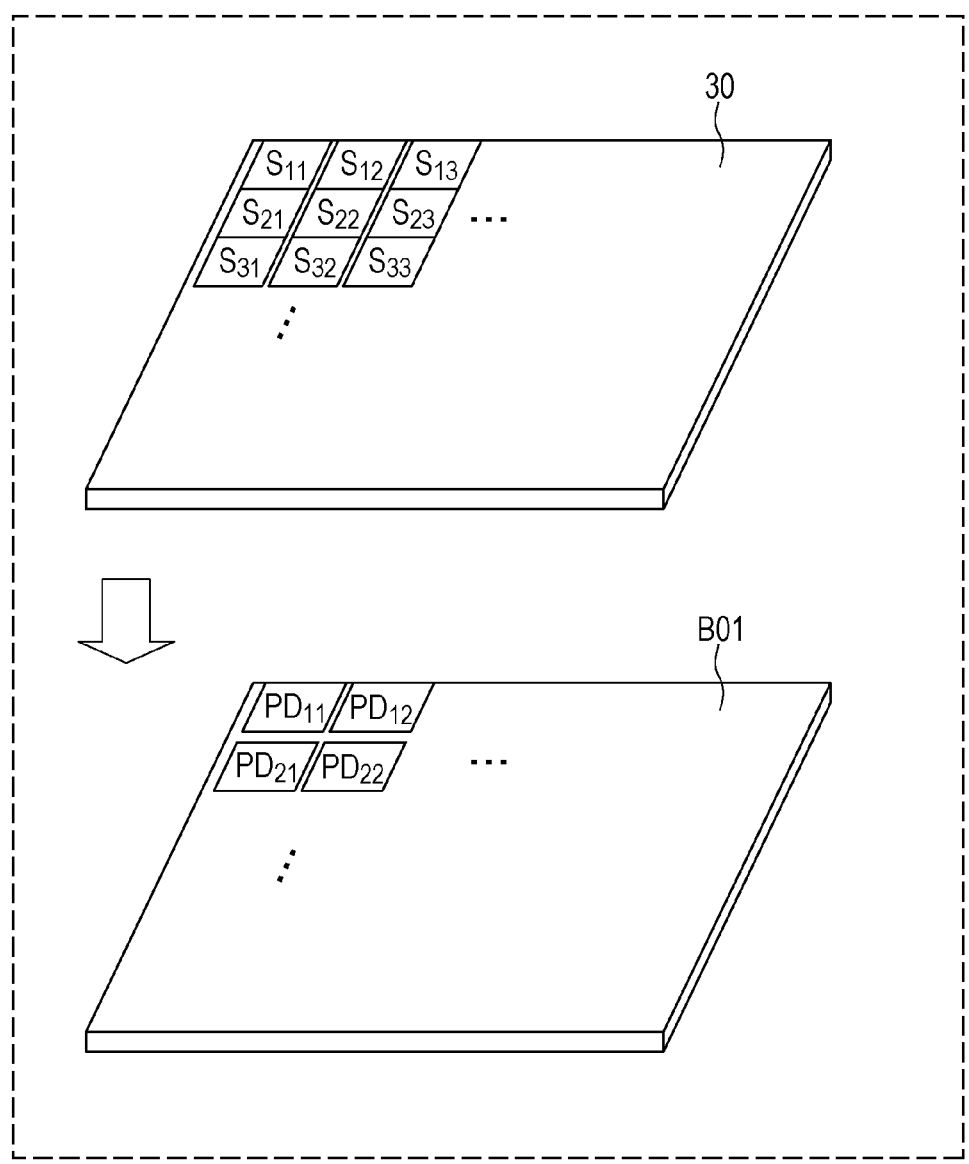
FIG. 21 is a perspective view illustrating a positional relationship between a pathological specimen and an image sensor.

In step S111, the lighting device 210 emits parallel light rays to a specimen as a photographing target as an angle adjusted in step S110. FIG. 20A and FIG. 20B illustrate how the lighting direction changes. The pathological specimen 30 and the image sensor B01 have a two-dimensional layout relationship as illustrated in FIG. 21. For simplicity of explanation, FIG. 20A and FIG. 20B illustrate a cross-section of a pixel region including a single photodiode PD. Light incident on the photodiode PD is converted into an electrical signal through photoelectric conversion. The size of the line of each arrow diagrammatically illustrates an amount of light incident on the photodiode PD, and the larger the size of the arrow line is, the higher amount of light is incident as illustrated in FIG. 20A and FIG. 20B.

Referring to FIG. 20A, parallel light rays enter right from above. In this case, light rays transmitted through regions S2 and S3 of the pathological specimen 30 are incident on the photodiode PD. Referring to FIG. 20B, parallel light rays emitted at an angle, and transmitted through regions S2, S3, and S4 of the pathological specimen 30 are incident on the photodiode PD. More specifically, as illustrated in FIG. 20B, half amount of each of the light rays transmitted through the regions S2 and S4 of the pathological specimen 30 is incident on the photodiode PD, and all amount of the light ray transmitted through the region S3 is incident on the photodiode PD. A pixel value different from the pixel value of FIG. 20A is thus output from the photodiode PD.

As illustrated in FIG. 20A and FIG. 20B, it is difficult to determine a pixel value at each of the regions S1, S2, S3, and S4 from a single image photographed at a single lighting direction alone. The specimen management apparatus 300 described above determines pixel values from multiple images with the lighting direction changed in response to the light rays transmitted through the regions S1, S2, S3, and S4 as illustrated in FIGS. 20A and 20B. The regions S1, S2, S3, and S4 are smaller in size than a single pixel, and correspond to sub-pixel regions. This is described in detail below.

A light ray may now be incident on the pathological specimen 30 at four different directions 1, 2, 3, and 4. Four images result with the light ray is incident at each of the four different directions 1, 2, 3, and 4. One pixel at the same location from among pixels forming the four images is now studied. The outputs of the photodiode PD included in the studied pixel are referred to as A1, A2, A3, and A4 in response to the lighting directions 1, 2, 3, and 4. Light transmittances of at the regions S1, S2, S3, and S4 in the pathological specimen 30 are designated S1, S2, S3, and S4. In the example of FIG. 20A, formula $A1=0 \times S1+1 \times S2+1 \times S3+0 \times S4$ holds. In the example of FIG. 20B, formula $A2=0 \times S1+(\frac{1}{2}) \times S2+1 \times S3+(\frac{1}{2}) \times S4$ holds. In the lighting direction S3 (not illustrated), formula $A3=0 \times S1+0 \times S2+(\frac{1}{2}) \times S3+1 \times S4$ holds. In the lighting direction S4 (not illustrated), formula $A4=(\frac{1}{2}) \times S1+1 \times S2+(\frac{1}{2}) \times S3+0 \times S4$ holds.

In the above example, light transmittances S1, S2, S3, and S4 depend on the tissue structure of the pathological specimen 30, and are not known. The light transmittances S1, S2, S3, and S4 are obtained by acquiring the four images of the outputs A1, A2, A3, and A4 of the photodiode PD. Simultaneous equations having the light transmittances S1, S2, S3, and S4 as four unknown quantities are determined, and the light transmittances S1, S2, S3, and S4 are thus calculated.

FIG. 22A illustrates elements of a matrix as coefficients of the simultaneous equations. By calculating a vector having as components the outputs A1, A2, A3, and A4 from an inverse matrix of the matrix, the light transmittances S1, S2, S3, and S4 of regions narrower than one pixel (sub-pixel region) are thus determined. As a result, an image having a resolution four times as high as the original image results. In other words, a high resolution image having an image density four times as high as the image density of the image sensor B01 is obtained.

The values of the matrix elements of FIG. 22A do not depend on the tissue structure of the pathological specimen 30 but depend on the structure of the image sensor B01 and the lighting directions. Given the same image sensor B01, the value of the matrix elements vary if the lighting directions change. FIG. 22B illustrates the values of the matrix elements when light is emitted in different lighting directions 1 through 8. The number of sub-pixel regions is eight, and light is directed to the pathological specimen 30 in at least eight different lighting directions 1 through 8, and eight outputs are obtained on each pixel. Light transmittances of eight sub-pixel regions as unknown quantities are determined. As a result, an image having a resolution eight times higher thus results. In other words, a high resolution image having a pixel density eight times as high as the pixel density of the image sensor B01 is obtained.

In this way, a higher resolution image results. In other words, the photographing operation is made with the lighting direction changed, and images at different resolutions (magnifications) are obtained. This operation is free from focusing using the objective lens.

Figure 18:
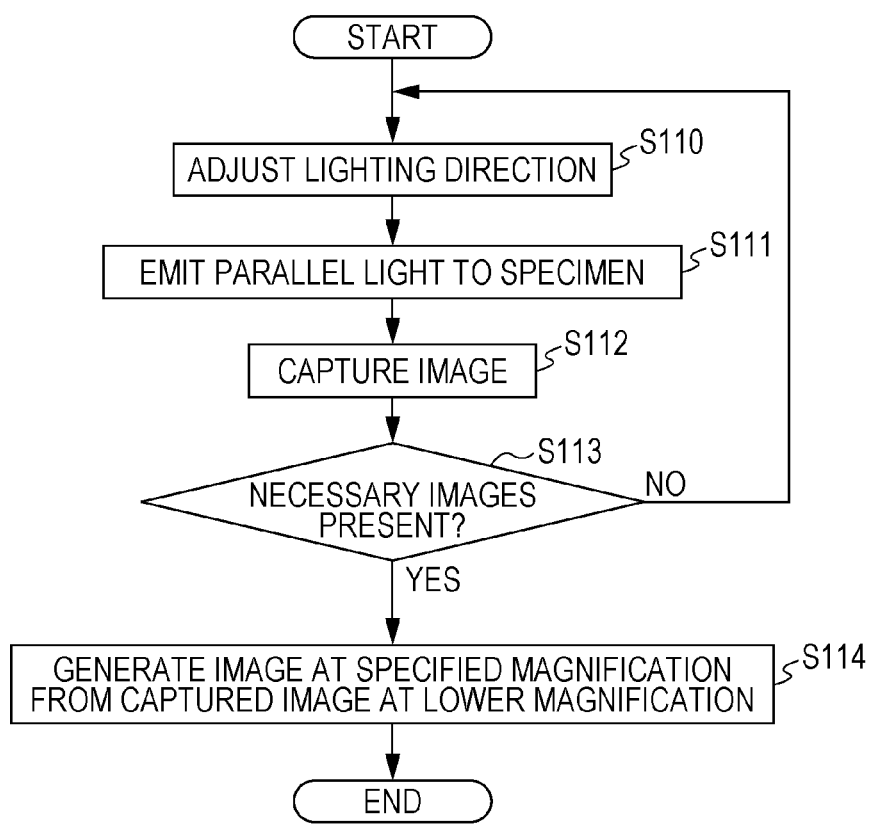
FIG. 18 is a flowchart illustrating an example of a process of image acquisition.

Referring to FIG. 18, the pathological specimen 30 is photographed by the image sensor B01 in step S112. A line sensor is typically used in a standard scanner. The use of an area sensor, such as a CCD image sensor, as the image sensor B01 allows the specimen to be photographed at a high speed in a wide area of the image used to identify the specimen. The specimen image acquisition apparatus 110 of FIG. 14 dispenses with a lens to control magnification, and generates an image at any magnification from among multiple images obtained with lighting directions changed.

In step S113, all images used to generate a specimen image at a specified magnification are prepared. If all the images are prepared, processing proceeds to step S114. If not all the images are prepared, processing returns to step S110 to capture an image lit at a desired lighting direction.

In step S114, the information processing apparatus 230 (see FIG. 14) generates an image at a specified magnification from multiple images photographed at different lighting directions from step S110 through S112. To generate the image at the specified magnification, a matrix of a pre-calculated relationship between a lighting direction and an amount of light incident on a photodiode PD is stored on the matrix storage unit 250 (see FIG. 17). FIG. 22A and FIG. 22B illustrate the examples of matrices indicating the relationships between the lighting directions and the light incident on the sensor. These matrices may be calculated based on the lighting direction, the size of the photodiode PD, and the desired size of the pixel. A test specimen having a known pixel value may be used. For example, the matrix may be experimentally calculated by measuring what percent of light is incident on the photodiode PD after the light is transmitted through a given region of the test specimen at an incident angle.

Let M represent a matrix that represents a relationship between the lighting direction and light incident on an imaging element, let A represent a pixel value vector, and let S represent a vector of desired pixel values, and a relationship of MS=A holds in each pixel. Since matrix M and vector A are known, matrix S may be determined through inverse matrix calculation. In step S114 of FIG. 18, a matrix representing the relationship between the lighting direction and the light incident on the photodiode PD is obtained from the matrix storage unit 250, and the inverse matrix calculator 240 (see FIG. 17) calculates each pixel value. Using the specimen management apparatus 300 thus constructed, the whole picture of the specimen is photographed at any magnification. The process described above may be performed by the specimen image acquisition apparatus 110.

In step S12 of FIG. 16, the image feature quantity calculator 120 calculates the image feature quantity identifying the specimen from the specimen image acquired in step S11. The image feature quantity may be color information of average luminance, shape feature, such as roundness, scale-invariant feature transform (SIFT), histogram of oriented gradient (HOG), or higher-order local autocorrelation (HLAC). A distance between a cell and its nucleus, or a ratio of color of nucleus to color of cell may serve as a feature quantity specific to a pathological image.

Figure 23:
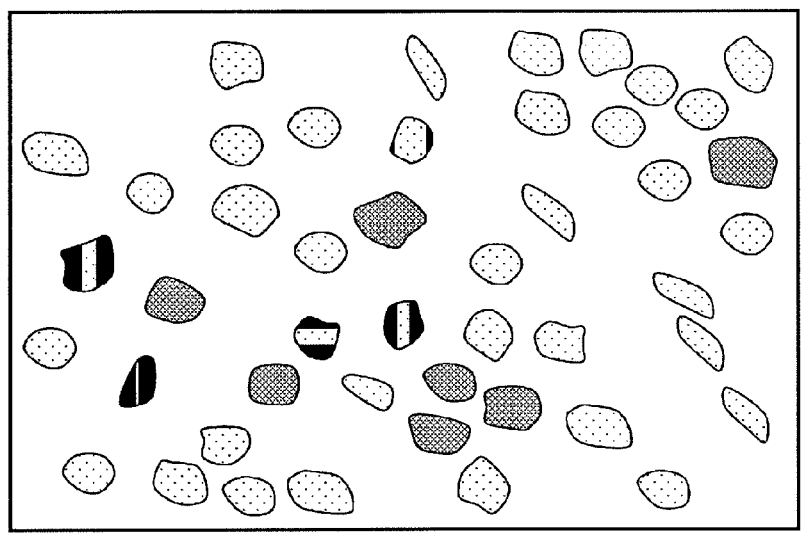
FIG. 23 illustrates an example of an image obtained when a pathological specimen is observed at a higher magnification (at a higher resolution)
Figure 24:
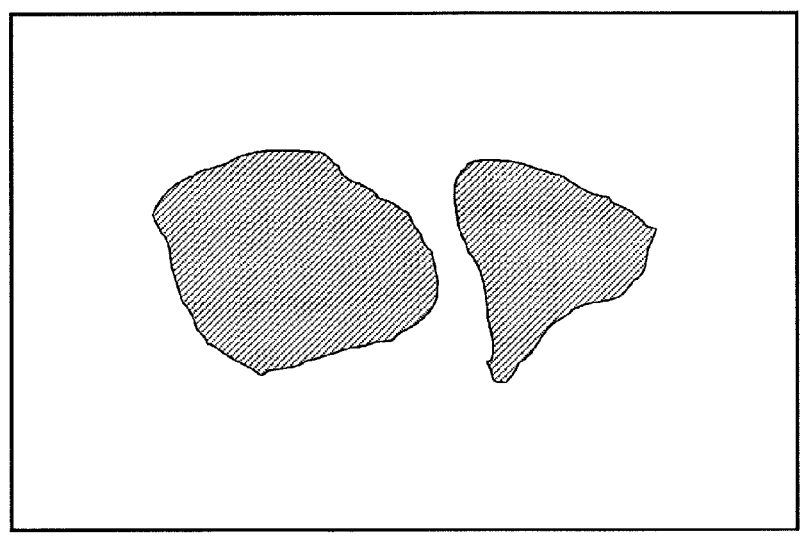
FIG. 24 illustrates an example of image obtained when the pathological specimen is observed at a lower magnification (at a lower resolution)

FIG. 23 and FIG. 24 illustrate pathological images. FIG. 23 illustrates a pathological specimen observed at a high magnification (such as a magnification of 200 times or more), and FIG. 24 illustrates a pathological specimen observed at a low magnification (such as a magnification less than 10 times). A magnification of N times means that a resolution of an image (the number of pixels or a pixel density per image) increases to N×N times. The magnification on a display screen of a display included in the output apparatus 170 is defined by a ratio of a pixel pitch of the imaging element to a screen pitch of the display.

If the pathological specimen is observed at a high magnification as illustrated in FIG. 23, cells and nucleuses are observable. Since the layout of and distance between a cell and its nucleus are different depending on specimen, the average distance between cells and nucleuses may be used as a feature identifying a specimen. Since the tissue as an observation target in the pathological specimen is transparent as it is, the pathological specimen is typically stained for easier observation. The staining method includes hematoxylin and eosin stain as a basic staining method, or a variety of immunostaining in which stain is performed in view of purposes of a particular examination. The ratio of cells to nucleus differently stained may be used as a feature. For example, in Ki-67 as one of immunostaining, growing cells are stained reddish brown, and other cells are stained blue. Such ratios not only serve as a measure in diagnosis, but also are useful as identification information of the pathological specimen. In step S12, the image feature quantity may be modified depending on the magnification of the pathological specimen image. In the pathological specimen, image features greatly change in accordance with the magnification in use. When the specimen is observed at a high magnification as illustrated in FIG. 23, the cells and nucleuses are observable. At a low magnification, the entire shape of the pathological specimen is recognizable as illustrated in FIG. 24. In view of these features, feature quantities appropriate for general shape recognition, such as roundness, SIFT, HOG, or HLAC, may be mainly used in the image at a low magnification. Features characteristic of the pathological specimen, such as the distance between the cell and nucleus, or the ratio of stained colors may be used in the image at a high magnification. More specifically, if the resolution of image is lower than a criterion, at least one of roundness, SIFT, HOG, and HLAC is calculated and acquired. If the resolution of image is equal to or above the criterion, the average distance between the cells and the nucleuses and/or the ratio of the differently stained colors may be calculated in addition to the feature quantity.

Figure 27:
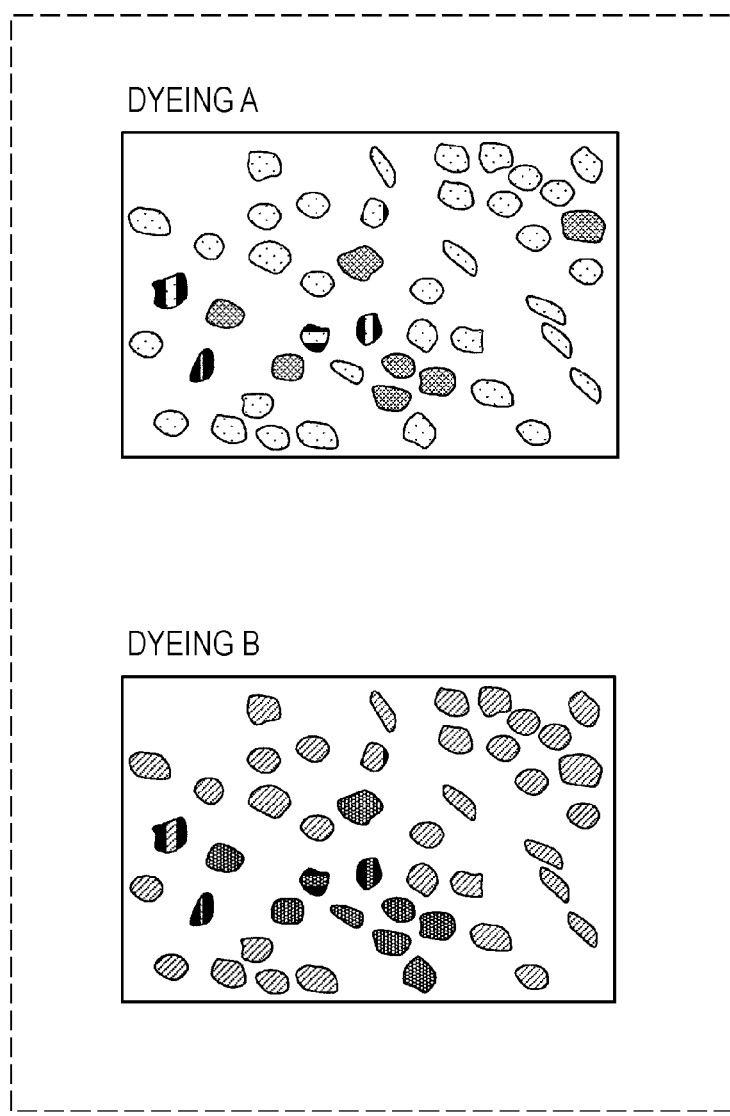
FIG. 27 diagrammatically illustrates an example of differently stained specimens of the same patient.

In step S13 (see FIG. 16), the information searching unit 130 retrieves from the database 140 patient data matching the image feature quantity calculated in step S12 (see FIG. 15). FIG. 25 illustrates an example of the database. The database includes an image feature quantity calculated from the pathological specimen image, an imaging magnification of the specimen image from which the image feature quantity is calculated, and patient data associated with the patient information. Since the patient information is stored in such a format, the patient data having the image feature quantity matching the image quantity calculated in step S12 is searched for in the database. The match condition in the search may be full match of the image feature quantities. If the image feature quantity is expressed in a vector, the images are determined to be matched if an Euclidean distance between vectors is equal to or below a predetermined threshold value. The database may be in a format as illustrated in FIG. 26. In the format of FIG. 26, information of the specimen of the same patient with different stains is associated and stored by attaching identification (ID) to the patient. In the pathological examination (tissue diagnosis) today, immunostaining in which staining is performed in view of purposes of a particular examination is typically performed in addition to hematoxylin and eosin stain as a basic stain method. The specimens of the same patient with different stains are different in color but generally similar in shape as illustrated in FIG. 27. This is because when multiple stain samples are produced from the same patient, the samples are often taken from continued slices. The characteristics of the pathological specimens may be used. Since the specimen image of the specimen is acquired as an image in the disclosure, the different stain specimens of the same patient may be automatically associated by comparing the shape feature quantities of the acquired images.

In step S14, it is determined whether the search results in step S13 indicate that the patient data having the same image feature quantity as the image feature quantity calculated in step S12 is present in the database 140. If the patient data having the same image feature quantity is not present, processing proceeds to step S15. If the patient data having the same image feature quantity is present, processing proceeds to step S17.

In step S15, the input apparatus 160 requests the patient information corresponding to the pathological specimen loaded in step S10 to be input. In step S16, the patient information input in step S15 is stored on the database 140 in association with the magnification of the specimen image acquired in step S11 and the image feature quantity calculated in step S12.

In step S17, it is determined whether the search results in step S13 indicates that multiple pieces of the patient information having the same image feature quantity as the image feature quantity calculated in step S12 are present in the database 140. If multiple pieces of the patient information having the same image feature quantity are present in the database 140 and it is difficult to identify a single piece of the patient information, processing proceeds to step S18. If a single piece of the patient information having the same image feature quantity is present, processing proceeds to step S19.

If the patient information is not identified, the specimen image acquisition apparatus 110 changes the magnification in step S18, and returns to step S11. The pathological specimen has a feature that if the specimens are similar in shape at a low magnification, a difference therebetween is definitely recognizable at cell and nucleus level at a high magnification. There is a trade-off between time to capture the specimen images in step S11 and the magnification. For this reason, the specimen image is identified at a lower magnification first. In an efficient way, if the specimen image is not identified at a lower magnification, the magnification may be increased. More specifically, operations in steps S11 through S17 are repeated with the magnification increased until a single piece of patient information is identified. When patient information of a new specimen is added to the database, the information searching unit 130 searches the database for a case matching a shape feature quantity not dependent on color, from among the feature quantities of the image. If a matching case is hit, the case may be associated with the different stained specimen of the same patient.

In step S19, the output apparatus 170 outputs the patient information acquired in step S13. The output apparatus 170 may not necessarily have to include a display or a printer. Alternatively, the output apparatus 170 may be connected to an external display or an external printer, and may output the signal to the external display or the external printer.

As described above, the pathological specimen is managed precisely without imposing an excessive workload on an operator. The specimen management of the embodiment is free from attaching a bar code or an IC tag onto the pathological slide.

Another configuration of the specimen management apparatus is described with reference to FIG. 28 and FIG. 29.

Figure 28:
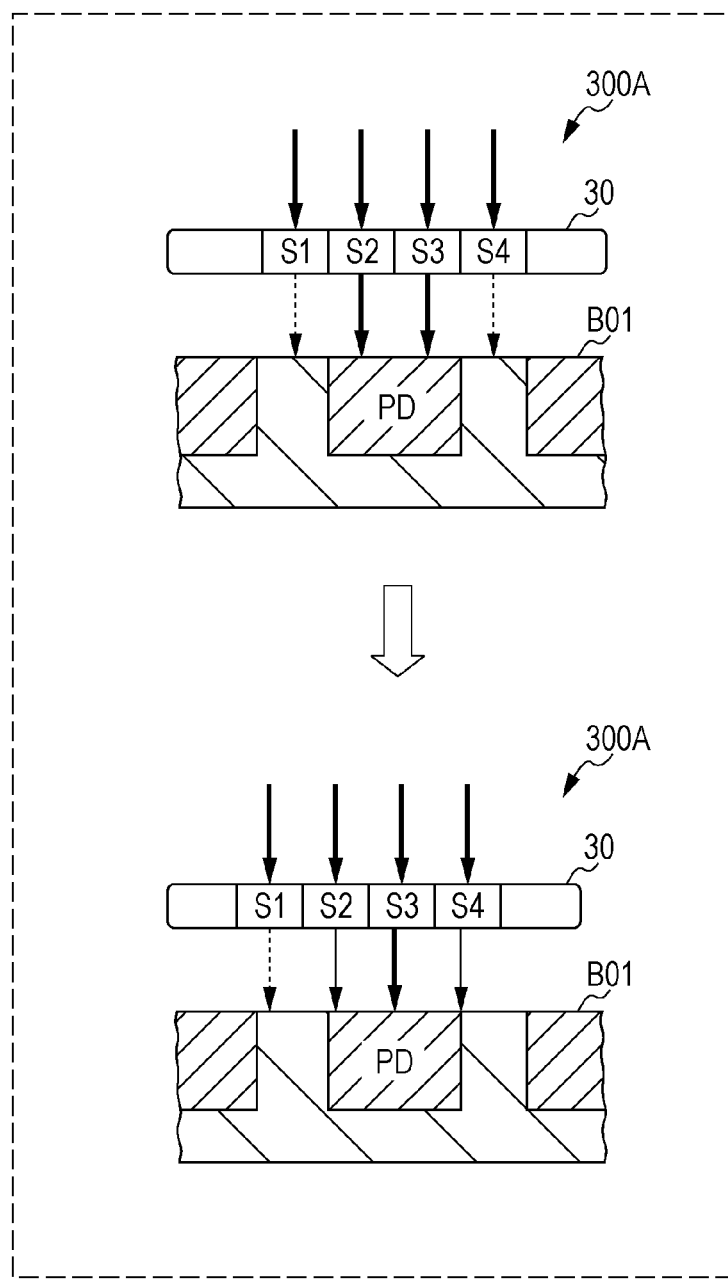
FIG. 28 illustrates an operation (movement of a specimen) in a specimen image acquisition apparatus.

A specimen management apparatus 300A photographs the pathological specimen 30 placed on the socket C03 while moving the pathological specimen 30 as illustrated in FIG. 28. The specimen management apparatus 300A thus photographs multiple images to generate a specimen image at a higher magnification. The configuration except the specimen image acquisition apparatus is similar to the configuration of the specimen management apparatus 300.

Figure 29:
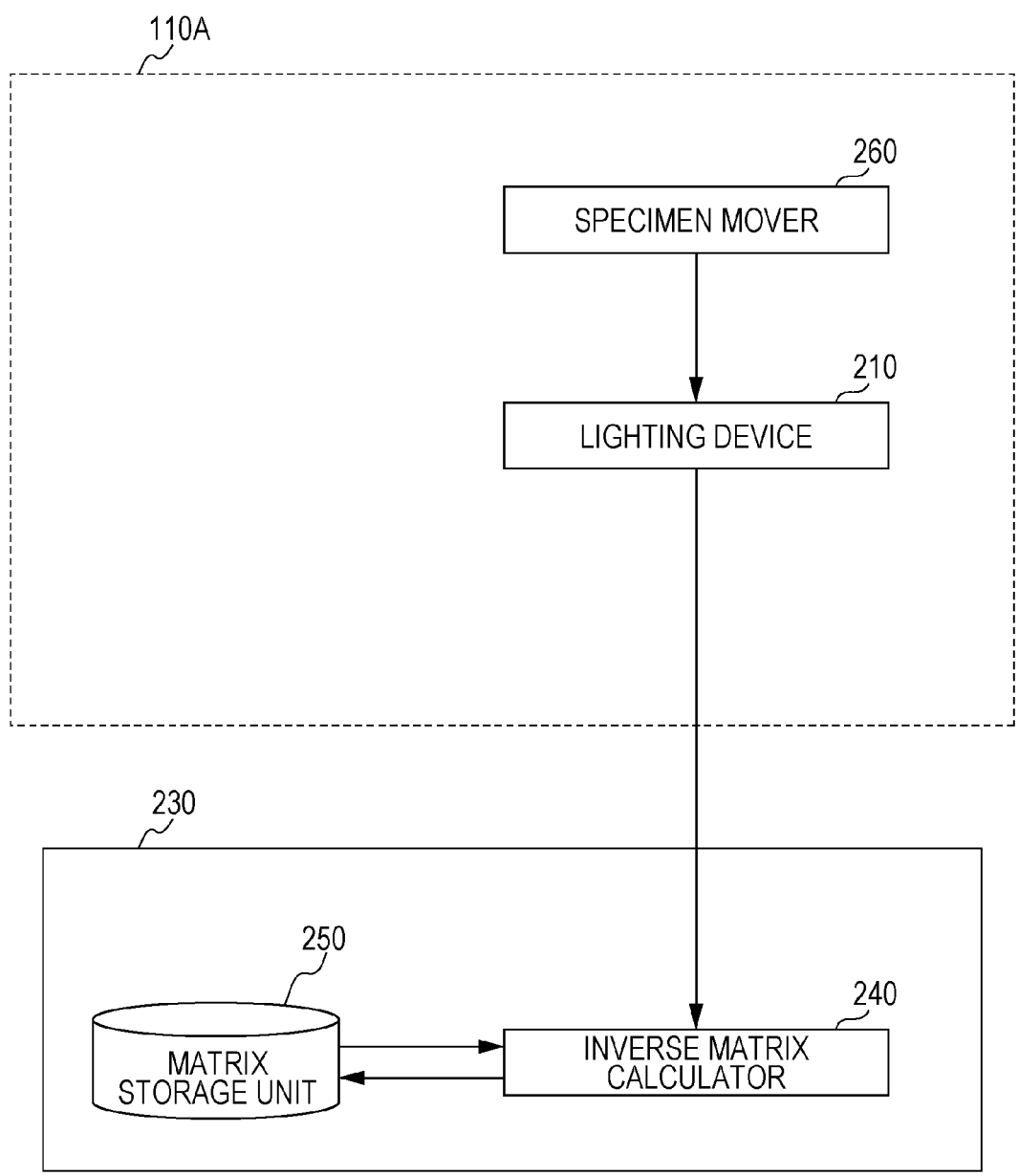
FIG. 29 is a block diagram illustrating an example of the specimen image acquisition apparatus.

FIG. 29 is a block diagram illustrating an example of the specimen image acquisition apparatus 110A included in the specimen management apparatus 300A. Referring to FIG. 29, the specimen image acquisition apparatus 110A is different from the specimen image acquisition apparatus 110 of FIG. 17 in that the specimen image acquisition apparatus 110A includes a specimen mover 260 in place of the lighting direction adjuster 200. The specimen image acquisition apparatus 110A acquires multiple images in order to obtain an image at a higher magnification by photographing the specimen with the specimen moved rather than acquiring multiple images with the parallel light rays changed in lighting direction. The matrix storage unit 250 stores a matrix that represents a relationship of a moving direction, a distance of movement, and light incident on the imaging element in place of the matrix representing the relationship between the lighting direction and the light incident on the imaging element. The specimen image acquisition apparatus 110A implements a function of acquiring an image at any magnification in operations similar to those in steps S110 through S114 described with reference to FIG. 18. In step S110, however, the specimen placed on the socket C03 is moved with the lighting direction of the parallel illumination light rays unchanged. In the example, the direction of the parallel light rays incident on the pathological specimen may be fixed. With the operations similar to the operations of the specimen image acquisition apparatus 110 in steps S111 through S114, an image at a higher magnification results from multiple images at a lower magnification.

The disclosure finds applications in a specimen management apparatus that manages specimens.

What is claimed is:

1. A preparation element set, comprising:
   an image sensor including a sensor surface, a sensor back surface opposite to the sensor surface, and a board;
   a package including a front surface, a back surface opposite to the front surface, and a plurality of terminals on the back surface, the front surface touching or facing the sensor back surface; and
   a transparent plate facing the sensor surface with a subject placed therebetween,
   wherein the board includes a board surface and a board back surface opposite to the board surface,
   wherein a distance between the board surface and the sensor surface is less than a distance between the board back surface and the sensor surface,
   wherein a distance between the board surface and the sensor back surface is more than a distance between the board back surface and the sensor back surface,
   wherein a plurality of conductive holes pierces the board from the board surface to the board back surface, and
   wherein a plurality of conductors on the board surface is electrically connected to the plurality of terminals by using the plurality of conductive holes.

2. The preparation element set according to claim 1, wherein the board is manufactured of a semiconductor, and includes a plurality of electrodes on the board back surface connected to the plurality of conductors on the board surface, and
   wherein the electrodes are electrically connected to the terminals of the package.

3. The preparation element set according to claim 2, wherein the image sensor has a through silicon via (TSV) structure.

4. The preparation element set according to claim 2, wherein the electrodes are covered with an insulator disposed on the front surface of the package.

5. The preparation element set according to claim 1, wherein the transparent plate is a slide glass plate having a size of 76 mm in a first direction and 26 mm in a second direction perpendicular to the first direction.

6. A preparation comprising:
   an image sensor including a sensor surface, a sensor back surface opposite to the sensor surface, and a board;
   a package including a front surface, a back surface opposite to the front surface, and a plurality of terminals on the back surface, the front surface touching or facing the sensor back surface; and
   a transparent plate facing the sensor surface with a subject placed therebetween,
   wherein the board includes a board surface and a board back surface opposite to the board surface,
   wherein a distance between the board surface and the sensor surface is less than a distance between the board back surface and the sensor surface,
   wherein a distance between the board surface and the sensor back surface is more than a distance between the board back surface and the sensor back surface,
   wherein a plurality of conductive holes pierces the board from the board surface to the board back surface, and
   wherein a plurality of conductors on the board surface is electrically connected to the plurality of terminals by using the plurality of conductive holes.

7. The preparation according to claim 6, wherein the board is manufactured of a semiconductor, and includes a plurality of electrodes on the board back surface connected to the conductors on the board surface, and
   wherein the electrodes are electrically connected to the terminals of the package.

8. The preparation according to claim 7, wherein the image sensor has a through silicon via (TSV) structure.

9. The preparation according to claim 7, wherein the electrodes are covered with an insulator disposed on the front surface of the package.

10. The preparation according to claim 6, wherein the transparent plate is a slide glass plate having a size of 76 mm in a first direction and 26 mm in a second direction perpendicular to the first direction.

11. A manufacturing method of a preparation, comprising:
    making a front surface of a package including the front surface, a back surface opposite to the front surface, and a plurality of terminals on the back surface be in touch with or face a sensor back surface of an image sensor including a sensor surface, the sensor back surface opposite to the sensor surface, and a board;
    placing a subject on a transparent plate or the sensor surface; and
    fixing the transparent plate and the image sensor in a manner such that the transparent plate faces the sensor surface with the subject placed therebetween,
    wherein the board includes a board surface and a board back surface opposite to the board surface,
    wherein a distance between the board surface and the sensor surface is less than a distance between the board back surface and the sensor surface,
    wherein a distance between the board surface and the sensor back surface is more than a distance between the board back surface and the sensor back surface,
    wherein a plurality of conductive holes pierces the board from the board surface to the board back surface, and wherein a plurality of conductors on the board surface is electrically connected to the plurality of terminals by using the plurality of conductive holes.

12. The manufacturing method according to claim 11, wherein the fixing includes dipping the image sensor into a liquid, and placing the subject onto the sensor surface, wherein the manufacturing method further comprises pulling the image sensor with the subject placed on the sensor surface out of the liquid.

13. The manufacturing method according to claim 11, further comprising, subsequent to placing the subject on the transparent plate or the sensor surface, staining the subject; and
drying the subject.

14. An imaging apparatus comprising:
a socket that is loaded with the preparation according to claim 6, and is electrically connected to the image sensor via the plurality of terminals;
a light source unit that emits light on the image sensor via the transparent plate; and
a control device that causes the image sensor to photograph the subject by controlling the light source unit and the image sensor on the preparation loaded in the socket.

15. The imaging apparatus according to claim 14, wherein the light source unit comprises a plurality of light sources or a moving light source, and
wherein the control device emits the light onto the subject with an angle of the light changed by plural times to photograph the subject at different angles.

16. An imaging method comprising:
loading the preparation according to claim 6 into a socket of an imaging apparatus and electrically connecting the socket to the image sensor via the plurality of terminals;
emitting light from a light source unit to the image sensor through the transparent plate; and
causing the image sensor to photograph the subject by controlling the light source unit and the mage sensor on the preparation loaded in the socket.

17. The imaging method according to claim 16, wherein the light source unit comprises a plurality of light sources or a moving light source, and
wherein the causing includes emitting the light onto the subject with an angle of the light changed by plural times to photograph the subject at different angles.

18. A preparation element set comprising:
an image sensor chip including a semiconductor board having a plurality of through-holes, a plurality of photoelectric converters disposed on a front side of the semiconductor board, and a signal pickup unit disposed on a back surface of the semiconductor board opposite to the front side and electrically connected to a circuit disposed on the front side via the through-holes; and
a transparent preparation, the image sensor chip being glued to the transparent preparation with a subject placed therebetween,
wherein the signal pickup unit is to be contacted with a front surface of a package,
wherein the package includes the front surface, a back surface opposite to the front surface, and a plurality of terminals on the back surface,
wherein the image sensor chip includes a sensor surface and a sensor back surface opposite to the sensor surface, and
wherein a distance between the front side of the semiconductor board and the sensor back surface is more than a distance between the back surface of the semiconductor board and the sensor back surface.

* * * * *